(12) United States Patent
Flen et al.

(10) Patent No.: US 7,102,490 B2
(45) Date of Patent: Sep. 5, 2006

(54) ENDPOINT TRANSMITTER AND POWER GENERATION SYSTEM

(75) Inventors: Rolf J. Flen, Pequot Lakes, MN (US); Stuart L. Haug, Hackensack, MN (US); Matthew David Ruohoniemi, Pine River, MN (US)

(73) Assignee: Hunt Technologies, Inc., Pequot Lakes, MN (US)

( * ) Notice: Subject to any disclaimer, the term of this patent is extended or adjusted under 35 U.S.C. 154(b) by 0 days.

(21) Appl. No.: 10/627,587

(22) Filed: Jul. 24, 2003

(65) Prior Publication Data

US 2005/0017849 A1 Jan. 27, 2005

(51) Int. Cl.
*G05B 11/01* (2006.01)

(52) U.S. Cl. .................... 340/310.18; 340/310.11; 340/310.16

(58) Field of Classification Search ........... 340/310.01, 340/310.02, 310.03, 310.04, 310.06, 310.07, 340/310.08, 310.11, 310.16, 310.17, 310.18
See application file for complete search history.

(56) References Cited

U.S. PATENT DOCUMENTS

| | | | | |
|---|---|---|---|---|
| 4,114,151 A | * | 9/1978 | Denne et al. ................ | 342/44 |
| 4,310,805 A | * | 1/1982 | Hackert et al. ............. | 331/1 A |
| 4,359,644 A | * | 11/1982 | Foord ......................... | 307/40 |
| 4,396,915 A | | 8/1983 | Farnsworth et al. ... | 340/870.03 |
| 4,517,562 A | * | 5/1985 | Martinez ............... | 340/825.52 |
| 4,636,771 A | | 1/1987 | Ochs ............................ | 307/3 |
| 5,416,364 A | * | 5/1995 | Divjak ...................... | 327/535 |
| 5,581,229 A | | 12/1996 | Hunt ...................... | 340/310.02 |
| 6,002,213 A | * | 12/1999 | Wood ......................... | 315/307 |
| 6,137,240 A | * | 10/2000 | Bogdan ..................... | 315/307 |
| 6,834,002 B1 | * | 12/2004 | Yang ......................... | 363/89 |

FOREIGN PATENT DOCUMENTS

WO   WO 92/21177   11/1992

* cited by examiner

*Primary Examiner*—Brent A. Swarthout
(74) *Attorney, Agent, or Firm*—Merchant & Gould P.C.

(57) ABSTRACT

An endpoint in a power distribution system includes a transmitter. The transmitter includes a transformer, a half-bridge driver, a first and second driver, and a resonant circuit. A primary winding from the transformer is coupled to a power distribution line, while the secondary winding is coupled to the transmitter. The half-bridge drive circuit selectively asserts drive signals. The resonant circuit has a natural resonant frequency in an audio frequency range. The half-bridge driver is arranged to selectively activate the first and second drivers such that the power-line is modulated with a square-wave signal at a frequency that is associated with encoded data. The half-bridge driver circuit can also be arranged to provide power to the transmitter, and to the endpoint.

17 Claims, 16 Drawing Sheets

| DataID | Name | Description |
|---|---|---|
| 0 | Null | Empty Packet or ending packet |
| 1 | KWH1 | Current power usage meter reading in units of kWH |
| 2 | TOU1 | Null or the total number of kWH accumulated in the TOU1 bucket |
| 3 | TOU2 | Null or the total number of kWH accumulated in the TOU2 bucket |
| 4 | TOU3 | Null or the total number of kWH accumulated in the TOU3 bucket |
| 5 | TOU4 | Null or the total number of kWH accumulated in the TOU4 bucket |
| 6 | Peak1 | Total number of kWH used at the recorded peak time for TOU1 Map |
| 7 | Peak2 | Total number of kWH used at the recorded peak time for TOU2 Map |
| 8 | Peak3 | Total number of kWH used at the recorded peak time for TOU3 Map |
| 9 | Peak4 | Total number of kWH used at the recorded peak time for TOU4 Map |
| 10 | Peak1Time | Time of peak demand for TOU1 Map |
| 11 | Peak2Time | Time of peak demand for TOU2 Map |
| 12 | Peak3Time | Time of peak demand for TOU3 Map |
| 13 | Peak4Time | Time of peak demand for TOU4 Map |
| 14 | Peak1Date | Date for Peak1 Demand |
| 15 | Peak2Date | Date for Peak2 Demand |
| 16 | Peak3Date | Date for Peak3 Demand |
| 17 | Peak4Date | Date for Peak4 Demand |
| 18 | LastPeak1 | Last Peak1 Demand |
| 19 | LastPeak2 | Last Peak2 Demand |
| 20 | LastPeak3 | Last Peak3 Demand |
| 21 | LastPeak4 | Last Peak4 Demand |
| 22 | LastPeak1Time | Time of Last Peak1 demand |
| 23 | LastPeak2Time | Time of Last Peak2 demand |
| 24 | LastPeak3Time | Time of Last Peak3 demand |
| 25 | LastPeak4Time | Time of Last Peak4 demand |
| 26 | LastPeak1Date | Date of Last Peak1 demand |
| 27 | LastPeak2Date | Date of Last Peak2 demand |
| 28 | LastPeak3Date | Date of Last Peak3 demand |
| 29 | LastPeak4Date | Date of Last Peak4 demand |
| 30 – 41 | ---------- | Reserved |

TABLE 1

| DataID | Name | Description |
|---|---|---|
| 42 | MomInt | Total number of momentary interruptions |
| 43 | MomEvent | Total number of momentary event interruptions |
| 44 | SusInt | Total number of sustained interruptions |
| 45 | SusIntDur | Total accumulated time for sustained interruptions |
| 46 | ConfigStatusFlags | Configuration status flags |
| 47 | SerNum | An internal serial number for the endpoint |
| 48 | ModelID | Identifies the model type or model family for the endpoint |
| 49 | HWRev | Hardware revision ID for the endpoint |
| 50 | SWVersion | Software version info for the endpoint |
| 51 | FlashCRC | CRC of application code |
| 52 | ReqID | Request ID of last async-type request received by the endpoint |
| 53 | LastResetTime | Time of last demand reset in minutes |
| 54 | LastResetDay | Day of the last demand reset in day-of-year format |
| 55 | Group 0 | Group Address that the endpoint subscribes to for downstream reception |
| 56 | Group 1 | Group Address that the endpoint subscribes to for downstream reception |
| 57 | Group 2 | Group Address that the endpoint subscribes to for downstream reception |
| 58 | Group 3 | Group Address that the endpoint subscribes to for downstream reception |
| 59 | Group 4 | Group Address that the endpoint subscribes to for downstream reception |
| 60 | Group 5 | Group Address that the endpoint subscribes to for downstream reception |
| 61 | Group 6 | Group Address that the endpoint subscribes to for downstream reception |
| 62 | Group 7 | Group Address that the endpoint subscribes to for downstream reception |
| 63 | PacketStartTime | Time of the day that the first bit of the upstream transmission starts |
| 64 | ElectricMetTime | The time at which electric metrology readings are captured - time in minutes |
| 65 | MomLogPtr | Memory address pointer for storing the next detected momentary interrupt |
| 66 | TxConst0 | Transmitter upstream frequency constant for logic 0 modulation |
| 67 | TxConst1 | Transmitter upstream frequency constant for logic 1 modulation |
| 68 | TxSubID | Sub-channel ID assigned for upstream communications |
| 69 - 129 | --- | Reserved |
| 130 | InternalBIT | Built in test flag for internal faults |
| 131 | InterfaceBIT | Built in test flag for interface faults |
| 132 | SystemStatus | Built in status flags |

TABLE 2

| DataID | Name | Description |
|---|---|---|
| 133 | Minutes | The current endpoint time in minutes (0 - 1439, 0 = Midnight) |
| 134 | DayOfWeek | The current endpoint day of the week (0 - 6, 0 = Sunday) |
| 135 | DayOfYear | The current endpoint day of the year (0-365, 0 = Jan 1) |
| 136 | TxBuffer | A variable length buffer that is internally used by the endpoint |
| 137 | SubIDCount | Number of SubIDs received by the endpoint since power-up |
| 138 | SequenceNum | The sequence number of the currently loaded packet |
| 139 | Temperature | The current internal temperature of the endpoint |
| 140 | SubID | Current sub-channel ID for the current downstream transmission |
| 141 | Demand | Instantaneous demand recorded by the endpoint over the last peak demand interval |
| 142 | WhiteFilter | Filtered maximum level for white while the disk is in the white state |
| 143 | BlackFilter | Filtered minimum level for black while the disk is in the black state |
| 144 | WhiteThreshold | Threshold above which the disk state is considered white |
| 145 | BlackThreshold | Threshold below which the disk state is considered black |
| 146 | OptoMin | Minimum reading for FilteredOpto |
| 147 | OpticMax | Maximum reading for FilteredOpto |
| 148 | FilteredOpto | Filtered optic reading that is used to determine the disk state |
| 149 | KhConst | 32-bit constant |
| 150 | AGCLevel | 8-bit AGC setting, where the gain of the front end is set to $2^{AGCLevel}$ |
| 151 | MeterGroupCRC | The CRC of the Meter and Group configuration settings |
| 152 | BlackMin | Minimum reading while disk is in a black state - unfiltered |
| 153 | WhiteMax | Maximum reading while disk is in a white state - unfiltered |
| 154 | OptoSample | Unfiltered Optic reading |
| 155 | kWHAccumulator | 32-bit partial kWH accumulator in units of $1/2^{24}$ of a kWH |
| 156 | Kp7680 | 8 Bit 7680 Hz FLL proportional error gain coefficient |
| 157 | Kd7680 | 8 Bit 7680 Hz FLL differential error gain coefficient |
| 158 | Kp60 | 8 Bit 60 Hz FLL proportional error gain coefficient |
| 159 | Kd60 | 8 Bit 60 Hz FLL differential error gain coefficient |
| 160 | Kc60 | 8 Bit 60 Hz FLL common gain coefficient |
| 161 | FLL7680UnLckCt | Unlocked counter for 7680 Hz FLL |
| 162 | FLL7680UnLckMax | Max since power-up of Unlocked counter for 7680 Hz FLL |

TABLE 3

| DataID | Name | Description |
|---|---|---|
| 163 | FLL60UnLckCt | Unlocked counter for 60 Hz FLL |
| 164 | FLL60UnLckMax | Max since power-up of Unlocked counter for 7680 Hz FLL |
| 165 - 254 | ------- | Reserved |
| 255 | OnesFill | 56-bit constant of all 1's for filling upstream packets when necessary |

TABLE 4

ENDPOINT TRANSMITTER AND POWER GENERATION SYSTEM

REFERENCE TO COPENDING APPLICATIONS

The present application is being filed concurrently with U.S. patent application Ser. No. 10/626,495, which is entitled Data Communication Over Power Lines, U.S. patent application Ser. No. 10/627,397 now U.S. Pat No 6,998,963, which is entitled Endpoint Receiver System, U.S. patent application Ser. No. 10/627,590, which is entitled Endpoint Event Processing System, U.S. patent application Ser. No. 10/626,465, which is entitled Power Line Communication System Having Time Server, and U.S. patent application Ser. No. 10/626,496, which is entitled Locating Endpoints In A Power Line Communication System, the entire disclosures of which are hereby incorporated by reference.

TECHNICAL FIELD

This invention relates generally to data communications. More particularly, the present invention is related to a transmitter system for transmitting data communications to a distribution substation over power lines.

BACKGROUND

As is true with most companies, utility companies are striving to reduce overhead costs, while providing more convenience to customers. For example, electric companies are migrating from costly and time-consuming manual methods of determining the amount of power consumed by customers of the power company. Traditionally, a person periodically came to the customer's home, and requested entry to read the consumer power usage from a power meter. This type of process was costly, slow, and intrusive to their customers.

Newer systems provide some level of remote communication between an endpoint such as an electrical meter and a central location. One such system is an automated meter reading (AMR) system that utilizes a power line to establish a data link between a concentrator and an endpoint meter reading units positioned downstream from the substation. The concentrator typically includes a transmitter for transmitting control information to the endpoint and a receiver for receiving data such as watt-hour information from the endpoint. The endpoint includes a transmitter, a receiver, and electronics or other circuitry for reading the meter. Other remote meter reading and data communication systems that use modems or radio frequency signals also can communicate with only one endpoint at a time and thus also have limited capacity.

These current systems have shortcomings. For example, the capacity of such systems is limited because the concentrator (or other central processing system if modems or RF are used) can receive signals from only one endpoint at a given time. This limitation provides a bottleneck that limits the processing power and flexibility of the system. Additionally, it limits the number of endpoints that the concentrator can communicate within a 24-hour period and hence limits the number of endpoints that can be connected downstream from any given concentrator.

The systems also have little scalability. This limitation is caused by two factors including the limited number of endpoints that can be connected downstream from a concentrator and by the manual programming required every time that an endpoint is added to the system.

Other shortcomings of current AMR and other power line data communication systems relate to reliability, flexibility, and scalability. For example, the system needs to be manually programmed each time an endpoint is added. In another example, if there is a power outage, automated meter reading systems generally require polling of the endpoints to determine which ones are still operational. This polling is slow and consumes processing and communication resources. Furthermore, current systems generally do not have the capability of reestablishing communication between an endpoint and an alternative concentrator if the communication link between the concentrator and the endpoint is disconnected by intentionally taking the substation off line, through a power failure.

BRIEF SUMMARY OF THE INVENTION

In general terms, the present invention is directed to apparatuses and methods that provide a flexible data communication system that provides data signals between an endpoint and a distribution substation over power-lines.

One aspect of the present invention is an apparatus for transmitting data that includes a transformer, a half-bridge driver, a first and second driver, and a resonant circuit. The transformer includes a primary winding that is coupled to the distribution line and a secondary winding that is coupled between a first node and a second node. The half-bridge drive circuit is configured to selectively assert a first drive signal and second drive signal in response to a control signal. The first driver is coupled between a first power-supply node and a common node, wherein the first driver is arranged to couple the first power-supply node to the common node when the first drive signal is asserted. The second driver is coupled between the common node and the second, node, wherein the second driver is arranged to couple the common node to the second node when the second drive signal is asserted. The resonant circuit is coupled between the first node and the common node, wherein the resonant circuit has a natural resonant frequency in an audio frequency range, and wherein the half-bridge driver is arranged to selectively activate the first and second drivers such that the power-line is modulated with a square-wave signal at a frequency that is associated with the encoded data.

Another aspect of the present invention is an apparatus for supplying power to an endpoint from a power signal on a distribution line in a power distribution network. The apparatus includes a transformer, a resonant circuit, a first diode circuit, a second diode circuit, a third diode circuit, a fourth diode circuit, and a capacitor. The transformer includes a primary winding that is coupled to the distribution line and a secondary winding that is coupled between a first node and a second node. The first diode circuit is coupled between a first power-supply node and the common node. The second diode circuit is coupled between the common node and a second power-supply node. The third diode circuit is coupled between the second node and the second power-supply node. The fourth diode circuit is coupled between the first power-supply node and the second node. The capacitor circuit is coupled between the first supply node and the second supply node.

Still another aspect of the present invention is an apparatus for generating a transmitter clock frequency from a power signal. A phase accumulator block is arranged to increase a phase signal in response to an interrupt. A phase latch block is arranged to capture a temporary phase error signal from the phase signal when a zero-crossing is detected in the power signal. A comparator block is arranged to compare the last error signal to the temporary phase error signal. A first summer block is arranged to increase an error signal when the last error signal is greater than the temporary phase error signal, and further arranged to decrease the error signal when the last error signal is less than the temporary phase error signal. A first delay block is arranged to provide the last error signal in response to the error signal. A filter block is arranged to provide a filtered signal in response to the phase error signal. A second delay block is arranged to provide a last filtered signal in response to the filtered signal. A second summer block is arranged to subtract the last filtered signal from the filtered signal to provide a difference signal. A first gain block is arranged to provide a proportional signal in response to the filtered signal, wherein the proportional signal is related to the filtered signal according to a proportional gain factor. A second gain block is arranged to provide a differential signal in response to the difference signal, where the differential signal is related to the difference signal according to a differential gain factor. A third summer block is arranged to combine the proportional signal and the differential signal to provide a correction signal. A fourth summer block is arranged to increase a timer adjustment signal in response to the correction signal such that a time interval associated with the interrupt is adjusted by changing the timer adjustment signal.

Yet another aspect of the present invention is an endpoint that is arranged to communicate with a distribution substation with a power signal over a distribution line in a power distribution network, where the endpoint includes a means for locking, a means for generating, and a means for modulating. The means for locking is arranged to lock a transmitter frequency to a multiple of the frequency that is associated with the power-signal. The means for generating is arranged to generate a carrier frequency for the transmitter in response to the transmitter frequency and a data signal such that the carrier frequency is changed according to the data signal. The means for modulating s arranged to modulate the power-signal according to the carrier frequency.

Figure 1:
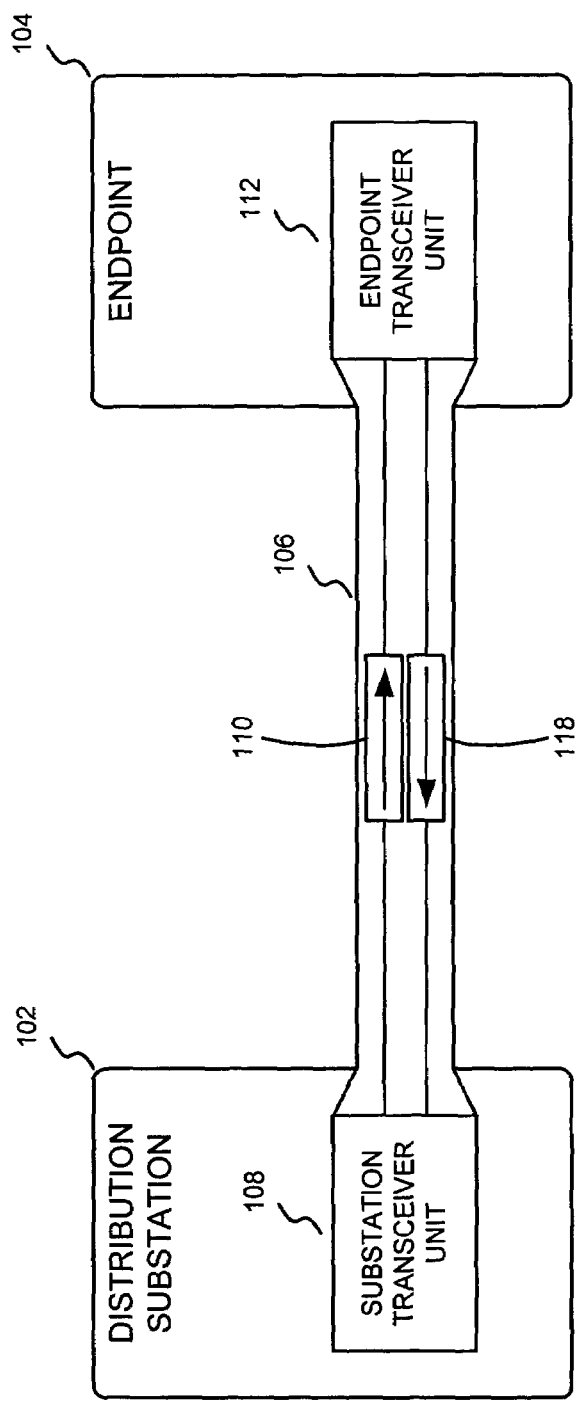
FIG. 1 is a block diagram illustrating one link of a power distribution network over which data is communicated between a distribution substation and an endpoint according to one possible embodiment of the present invention.

Tables 1–4 illustrate various parameters for an endpoint processor unit that is arranged according to one possible embodiment of the present invention.

DETAILED DESCRIPTION

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Briefly stated, an endpoint is configured for communication with a distribution substation. The endpoint includes a transceiver unit that is configured to receive command signals form the distribution substation, and provide FSK modulated signals to the substation via a power-line. The transmitter includes a resonant circuit and a half-bridge driver that are configured to drive square-wave modulated signals on the power-line to generate the FSK signal. The receiver uses an under-sampling technique to extract downstream signals from the power-line. A local power supply is generated from the power-line signal through the resonant circuit in the transmitter. Each endpoint is addressable by an ID code, and is configurable via downstream command signals that are associated with the ID code. The endpoint collects data at demand based and schedule based intervals. The collected data is formatted according to a flexibly defined protocol, and transmitted to the distribution substation at a designated time.

General System Overview

FIG. 1 is a block diagram illustrating one link of a power distribution network over which data is communicated between a distribution substation (102) and an endpoint (104) according to one possible embodiment of the present invention. The electrical distribution system, or distribution plant as it is sometimes referred to, corresponds to the portion of the electric power system that extends between a distribution substation and an endpoint such as a device at a customer premise. High voltage transmission lines in the electrical distribution system typically provide electricity from the power generator to a distribution substation. The distribution substation is arranged to reduce or "step down" the voltage for general distribution. Distribution lines are arranged to provide lower voltage electricity from the distribution substation to various downstream endpoints. The Distribution lines typically consist of underground cable, aerial cable, or overhead open-wire conductors carried on poles, or some combination of them.

Multiple layers of substations and switches may be connected in series between the power generator and the endpoint, where each consecutive substation further steps down the voltage of the transmitted electricity. Power generators and substations may be organized in a redundant network arrangement so that various generators and substations can be taken on-line and off-line without interrupting power service to endpoints at customer premises.

Distribution transformers are ordinarily connected in the distribution line between the distribution substation and the endpoint. The distribution transformers are arranged to further step-down the received power to a voltage level that is useable by consumers at a customer premise. Step-down transformers, which are often referred to as pole transformers, are arranged to supply power to a consumer or group of consumers over a secondary circuit. Each consumer is connected to the secondary circuit through a set of service leads and a utility meter.

The distribution substation (102) that is shown in FIG. 1 provides power to a customer device or endpoint 104 via a power distribution line 106. The distribution line (106) may be coupled to one or more step-down transformers prior to reaching the customer premise. The distribution line (106) provides the power necessary to operate electrical devices, located at the endpoint (104), which correspond to devices that are located at the customer premise.

For a variety of reasons, it may be desirable to communicate information between the distribution substation (102) and one or more endpoints (104). For example, it may be desirable to control or monitor a meter-reading device that is installed at a customer premise to determine the power consumed at a particular customer premise. Additionally, control information could provide the ability to control or alter the operation of the meter-reading device and/or individual loads at the customer premise. Utility companies often provide a customer with a power rate discount if the customer agrees to allow for a temporary adjustment of their consumption. For example, a power company may provide a customer with a rate discount where the customer agrees to allow the power company to temporarily adjust or terminate their power consumption for certain nonessential power consuming devices, such as water heaters, swimming pool heaters, air conditioners, etc. during peak operation. This allows the utility company to limit the peak power consumption when necessary, hereinafter referred to as "load control".

Other non-control related information might also be communicated between the endpoint and the substation via the power distribution lines. These general information signals are transmitted in the same manner as signals intended to control a customer device. Such general information signals include information to display or store the price of power at the customer premise, the date and time, the temperature or other information capable of being received and processed at the customer premise. For example, the time displayed on an electronic device at the customer premise could be periodically adjusted so that the time at the customer premise is synchronized with the time at the utility station.

Various embodiments of the apparatuses and methods disclosed herein are arranged to communicate signal (referred to as downstream signals) to endpoints 104 via distribution line 106. Signals (referred to as upstream signals) may also be communicated from endpoint 104 to distribution substation 102 via distribution line 106, thereby creating a two-way communication link between distribution substation 102 and endpoint 104 via distribution line 106. The aforementioned examples of control signal applications where control signals (and/or general information signals) are provided by the distribution substation to an endpoint 104 are merely representative of the various uses that such control signals provide. Therefore, the examples provided throughout the application are illustrative in nature, as the invention is not limited to any particular control signal use.

Distribution substation 102 includes a substation transceiver unit (108) that is used to drive downstream signals along distribution line 106, as represented by arrow 110. Endpoint 104 includes an endpoint transceiver unit (112) that is configured to receive the downstream signals from distribution line 106. Endpoint transceiver unit 112 is also arranged to drive upstream signals to distribution line 106, as indicated by arrow 118. Substation transceiver unit 108 is also arranged to receive the upstream signals from distribution line 106. Distribution line 106 is configured to permit full-duplex communications between distribution substation 102 and endpoint 104, where full-duplex refers to simultaneous communications in both directions. However, upstream and downstream signal transmission speeds may differ from one another in full-duplex communication. Full-duplex communication links provide for reliable transmission of control information, without the need for additional wiring, thereby minimizing cost and increasing data integrity.

Power Distribution Network

Figure 2:
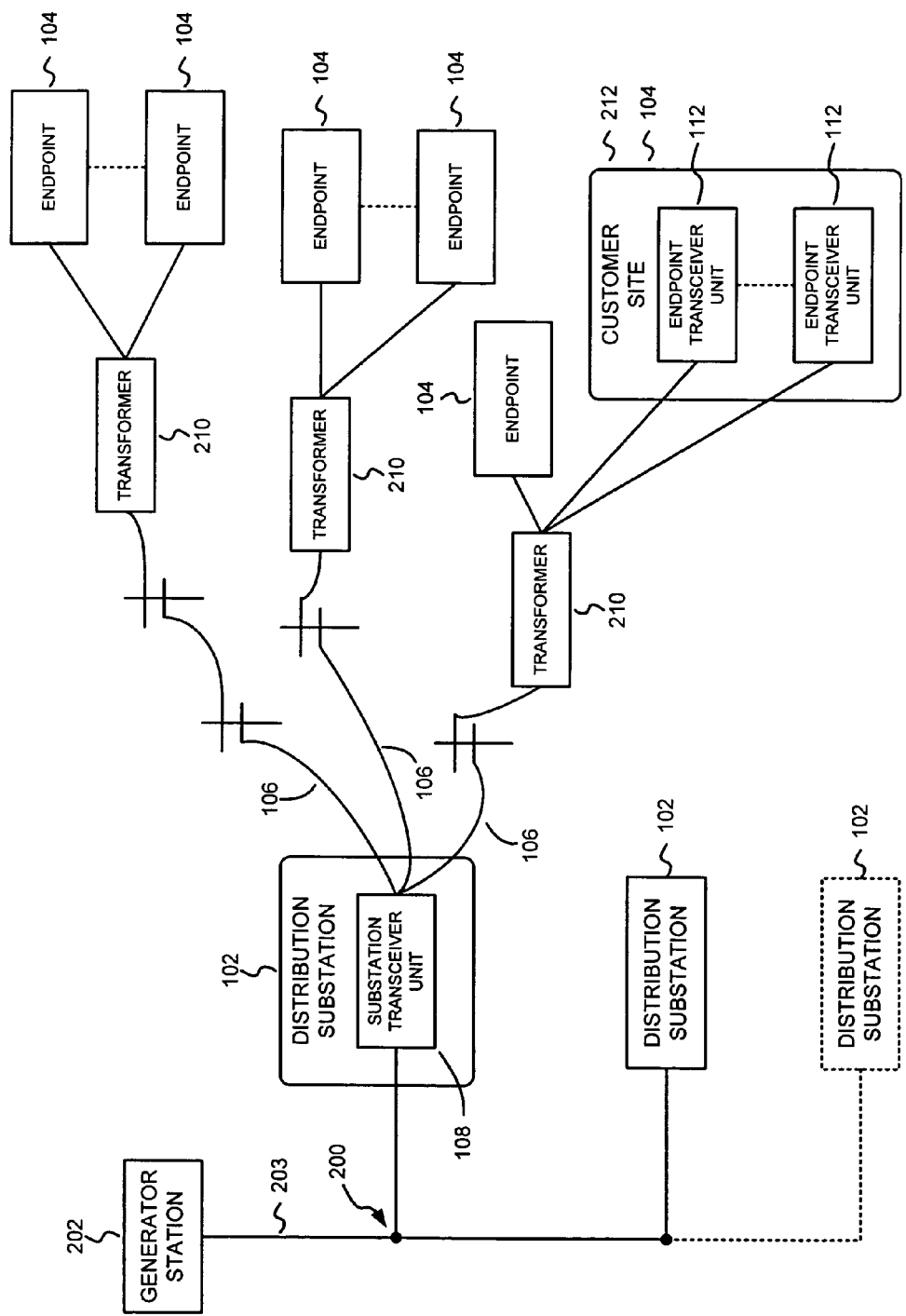
FIG. 2 is a block diagram illustrating a portion of a power distribution network over which data is communicated between a distribution substation and an endpoint according to one possible embodiment of the present invention.

FIG. 2 is a block diagram illustrating a portion of a power distribution network over which data is communicated between a distribution substation (102) and an endpoint (104) according to one possible embodiment of the present invention. The block diagram illustrated in FIG. 2 operates similar to that previously described with respect to FIG. 1.

Generating station 202 is arranged to provide bulk power to downstream distribution substations 102 via high-power transmission lines 203. At least one of the distribution substations 102 includes a substation transceiver unit (108). Substation transceiver unit 108 can simultaneously communicate data via the distribution lines 106 to multiple endpoints 104, which reside in one or more customer premises. Communication signals that may include control information can pass through transformers 210, and ultimately to a particular endpoint 104 at a particular customer premise.

A common transformer (210) may service multiple endpoints (104), which may correspond to multiple customer premises. Furthermore, a single customer premise such as site 212 may include a plurality of different customer devices such as endpoints that include endpoint transceiver units 112. The transfer of control information from substation transceiver unit 108 to endpoints 104 is very useful and cost effective. In various embodiments, one or more of distribution substations 102 may include substation transceiver units 108 for communicating with endpoints 104 that are located downstream from distribution substation 102. In other embodiments, substation transceiver unit 108 is located at points that are upstream from multiple endpoints 104 other than distribution substation 102.

Substation Overview

Figure 3:
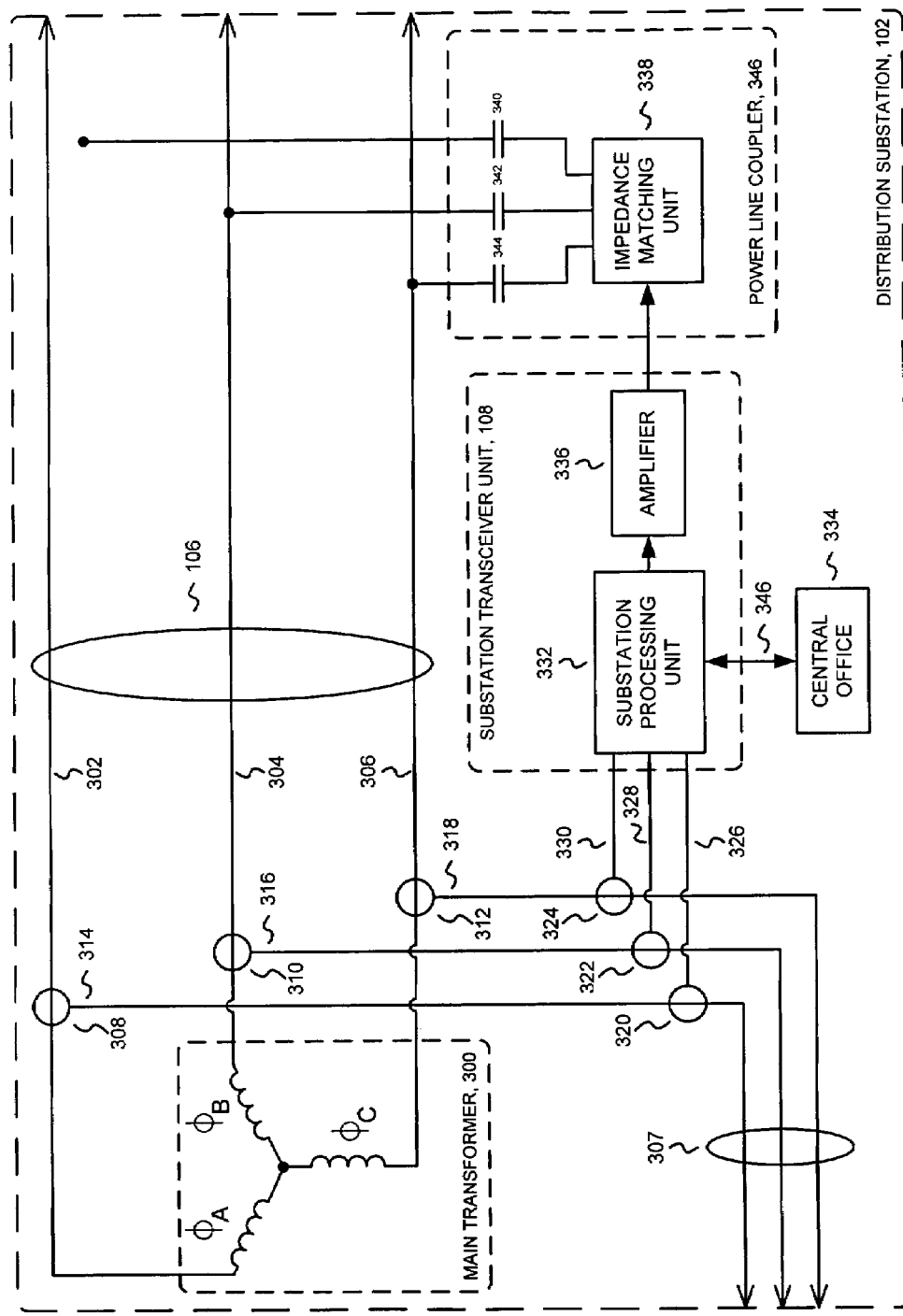
FIG. 3 is a schematic illustrating a distribution substation that is arranged according to one possible embodiment of the present invention.

FIG. 3 is a schematic illustrating a distribution substation (102) that is arranged according to one possible embodiment of the present invention. Distribution substation 102 is coupled to a distribution line (106). Distribution line 106 interfaces with main transformer 300 that provides three-phase power ($\Phi_A$, $\Phi_B$, and $\Phi_C$) and includes three conductors (302, 304, and 306), one for conducting each phase of the power. The first conductor (302) conducts $\Phi_A$, the second conductor (304) conducts $\Phi_B$, and the third conductor (306) conducts $\Phi_C$.

A metering loop 307 includes three metering lines (314, 316, and 318) that interface with conductors 302, 304, and 306, respectively. Metering line 314 is arranged to interface with conductor 302 through current transformer 308. Metering line 316 is arranged to interface with conductor 304 through current transformer 310. Metering line 318 is arranged to interface with conductor 306 through current transformer 312.

Substation transceiver unit 108 is arranged to receive signals from signal lines 326, 328 and 330, which interface with metering loop 307 through current transformers 320, 322, and 324, respectively. Substation transceiver unit 108 is also arranged to provide a downstream signal to conductors 302, 304, and 306 through power line coupler 346.

In this exemplary embodiment, upstream signals may be transmitted by an endpoint transceiver unit (112) to conductors 302, 304, and 306. Substation transceiver unit 108 is arranged to receive the upstream signal. One portion of the upstream signal is communicated over conductor 302 to metering line 314 via current transformer 308, where metering line 314 is coupled to a first input of substation transceiver unit 108 through current transformer 320 over signal line 326. Another portion of the upstream signal is communicated over conductor 304 to metering line 316 via current transformer 310, where metering line 316 is coupled to a second input of substation transceiver unit 108 through current transformer 322 over signal line 328. Still another portion of the upstream signal is communicated over conductor 306 to metering line 318 via current transformer 312, where metering line 318 is coupled to a second input of substation transceiver unit 108 through current transformer 324 over signal line 330.

Substation transceiver unit 108 includes a substation processing unit (332) and an amplifier (336). A downstream signal for an endpoint transceiver (112) is provided by substation processing unit 332 as an input of amplifier 336. Amplifier 336 provides signal gain to the downstream signal, which is in turn coupled to power line coupler 346.

Power line coupler 346 includes an impedance matching unit (338) and three capacitors (340, 342, and 344). Signals are communicated from impedance matching 338 onto each of the conductors 302, 304, and 306 through capacitors 340, 342, and 344, respectively. Impedance matching unit 338 is configured to match the impedance between the conductors 302, 304, and 306 and amplifier 336. Capacitors 340, 342, and 344 are arranged to provide electrical isolation between the impedance matching unit and distribution line 106.

In one exemplary embodiment, substation transceiver unit 108 is configured to transmit command and control signals to downstream endpoint transceivers 112. In another exemplary embodiment, substation transceiver unit 108 can address a downstream signal to a particular endpoint transceiver unit 112. In still another exemplary embodiment, substation transceiver unit 108 can address a downstream signal to a particular group of endpoint transceiver units 112. In yet another possible embodiment, the substation transceiver 108 can transmit a downstream signal onto one or more of the conductors 302, 304, or 306. For example, the substation transceiver 108 might transmit a downstream signal to a single conductor (e.g., 302) and not onto the other conductors (e.g., 304 and 306) of the distribution line (106).

Substation processing unit is arranged to communicate with a central office 334 via a data network 346. In various embodiments, the data network 346 is established using any suitable means for data communication. A non-exhaustive list of examples include: the Internet, an Intranet, a wide are network (WAN), a local area network (LAN), satellite, microwave, and a modem interfacing with a plain old telephone line (POTS).

Alternative structures that provide the same functionality may be employed for retrieving upstream signals from distribution line 106, for transmitting downstream signals to distribution line 106, and for processing the signals in the substation transceiver 108. For example, substation transceiver unit 108 might be broken into a separate receiver and transmitter module. Any appropriate combination of functional blocks that provide the same overall functionality is considered within the scope of the present invention.

General Communication Signal Flow

Figure 4:
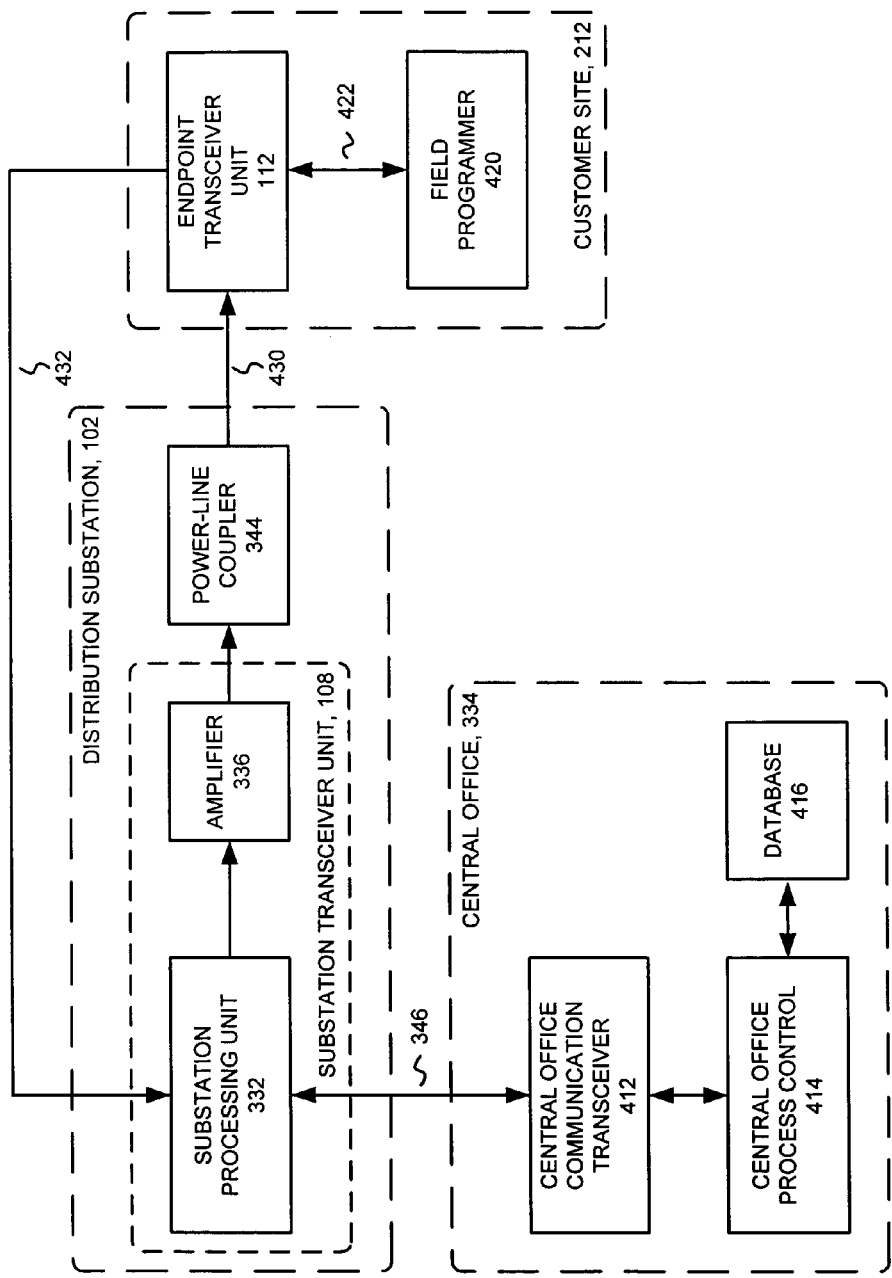
FIG. 4 is a block diagram illustrating signal flows to an example endpoint transceiver unit that is arranged according to one possible embodiment of the present invention.

FIG. 4 is a block diagram illustrating signal flows for an example endpoint transceiver unit that is arranged according to one possible embodiment of the present invention. As previously described with respect to FIG. 3, a distribution substation (102) is in communication with a central office (334) and an endpoint (212).

Endpoint transceiver unit 112 is generally arranged to provide reporting functions to distribution substation 102 according to metering data that is supplied from customer premise 212. The reporting functions are supplied by communicating an upstream signal (432) over an upstream communication channel (e.g., an FSK signal that is modulated on the power-line). The metering data may include average power usage, peak power usage, peak load time, as well as other metering parameters. Endpoint transceiver unit 112 may also be configured to cooperate with a field programmer unit (420), which can be used by a field operator to configure an endpoint transceiver unit, and for other demand based reporting functions. An example field programmer unit (420) includes an optically coupled hand-held programmer unit.

Distribution substation 102 is generally arranged to provide reporting functions to central office 334 according to data that is collected from all the endpoint transceiver units that are controlled by the substation. The reporting functions and command signals between distribution substation 102 and central office 334 are provided as network signals 346 over a network communication channel (e.g., LAN, WAN, Modem, etc.). Distribution substation 102 is also arranged to receive command signals from the central office 334. The command signals are processed by substation processing unit 332 and transmitted to endpoint transceiver unit 112 via downstream signal 430 over a downstream communication channel (e.g., an FSK signal that is modulated on the power-line).

Central office 334 is generally arranged to provide various power management functions, as well as data collection services. Central office 334 includes a central office communication transceiver unit (412) that is in communication with each distribution substation (102). Data that is collected from the substation processing units (332) is received by the central office communication transceiver (412), processed by a central office process control (414), and stored in a database (416). Various data manipulation functions can be performed on the collected data that is store in the database (416).

Downstream/Upstream Signals

The downstream signals that are provided to the endpoint transceiver units (112) are provided as non-return to zero inverted (NRZI) frequency shift keyed (FSK) signals. Endpoint transceiver units (112) receive downstream signals on a downstream channel that is different from the upstream channel. Each endpoint is assigned to a particular ID code and a group ID code. Data is encoded in the FSK signal that includes the ID codes for the intended receiving units. A logic 0 data signal is encoded on the downstream channel when the downstream frequency is unchanged between adjacent bit-times, while a logic 1 data signal is encoded on the downstream channel by changing the frequency between bit-times.

In one possible embodiment of this modulation scheme the downstream signal is provided as an FSK modulated signal on a 60 Hz line frequency, with a frequency of either 555 Hz or 585 Hz. In another possible embodiment of this modulation scheme the downstream signal is provided as an FSK modulated signal on a 50 Hz line frequency, with a frequency of either 462.5 Hz or 487.5 Hz.

The upstream stream signals that are provided by the endpoint transceiver units (112) are modulated using frequency shift keying (FSK). Each endpoint transceiver is assigned to a channel that corresponds to a particular modulation frequency. The FSK modulation technique is applied to the assigned channel for endpoint transceiver unit 112.

A logic 0 data signal may be encoded on the selected channel by modulating a square wave signal on the power-line with a frequency corresponding to a first frequency ($f_0$). A logic 1 data signal may be encoded on the selected channel by modulating a square wave signal on the power-line with a frequency corresponding to a second frequency ($f_1$), as given by: $f_1=f_0+$offset.

In one possible embodiment of this modulation scheme the upstream signal is provided as an FSK modulated signal on a 60 Hz line frequency, with a frequency band spanning from 970 Hz–1006 Hz. For this example, approximately 9000 possible channels may be encoded in the frequency band with a channel spacing of four milli-Hertz (4 mHz). For this example, the modulation frequencies may be given by:

$f_0$=(Channel−1)*4 mHz+970 Hz, and $f_1$=(Channel−1)*4 mHz+970 Hz+1.66 mHz.

In another possible embodiment of this modulation scheme the upstream signal is provided as an FSK modulated signal on a 50 Hz line frequency, with a frequency band spanning from 960 Hz–996 Hz. For this example, approximately 9000 possible channels may be encoded in the frequency band with a channel spacing of four milli-Hertz (4 mHz). For this example, the modulation frequencies may be given by:

$f_0$=(Channel−1)*4 mHz+960 Hz, and $f_1$=(Channel−1)*4 mHz+970 Hz+1.66 mHz.

The substation transceiver unit (108) is arranged to demodulate each signal that is received from separate endpoint transceivers (112) substantially simultaneously, which provides significant advantages. For example, it increases the capacity of the system because the substation transceiver unit (108) does not have to delay reception of one signal from an endpoint transceiver unit (112) until the reception of the previous signal is completed.

As further explained herein each distribution line 106 has three phases and one conductor 302, 304, and 306 for each phase. The interfaces with each of the three conductors 302, 304, and 306 may be arranged to receive one channel over each of the three conductors 302, 304, and 306. The substation transceiver unit 108 is arranged to demodulate signals from each conductor 302, 304, and 306 of the distribution line 106. This configuration gives the substation transceiver 106 the capacity to receive upstream signals from up to 9,000 endpoint transceiver units (112) along each of the conductors (302, 304, and 306). Moreover, the substation transceiver can be configured to receive redundant communications over each of the line conductors (e.g., the first phase and second phase can have identical information).

There are many other additional embodiments in addition to those described herein. For example, an endpoint transceiver unit (112) can communicate with the substation transceiver unit (108) using any modulation scheme, including modulation schemes other than FSK, that permit simultaneous or substantially simultaneous demodulation of signals received from the endpoint transceiver units (112). Additionally, other bandwidths can be used within the apparatus and methods disclosed herein. For example, the communication channel might include a frequency bandwidth other than 36 Hz and other then the range of 970 Hz to 1,006 Hz.

Other embodiments also might utilize different frequency ranges for communication over each of the conductors (302, 304, and 306) forming the distribution line (106) between the substation unit (102) and the endpoint (104). Thus, the conductor (302, 304, or 306) for one phase might have one bandwidth and frequency range for communicating signals, while the conductor of another phase might have a different bandwidth and/or frequency range for communicating signals from the endpoint transceivers (112).

In yet other embodiments, the endpoint transceivers 112 communicate using frequency bandwidths other than 4 mHz. For example, various embodiments might use a frequency bandwidth of about 10 mHz or less, including frequencies of 2 mHz, 6 mHz, and 8 mHz.

Endpoint Transceiver Unit

Figure 5:
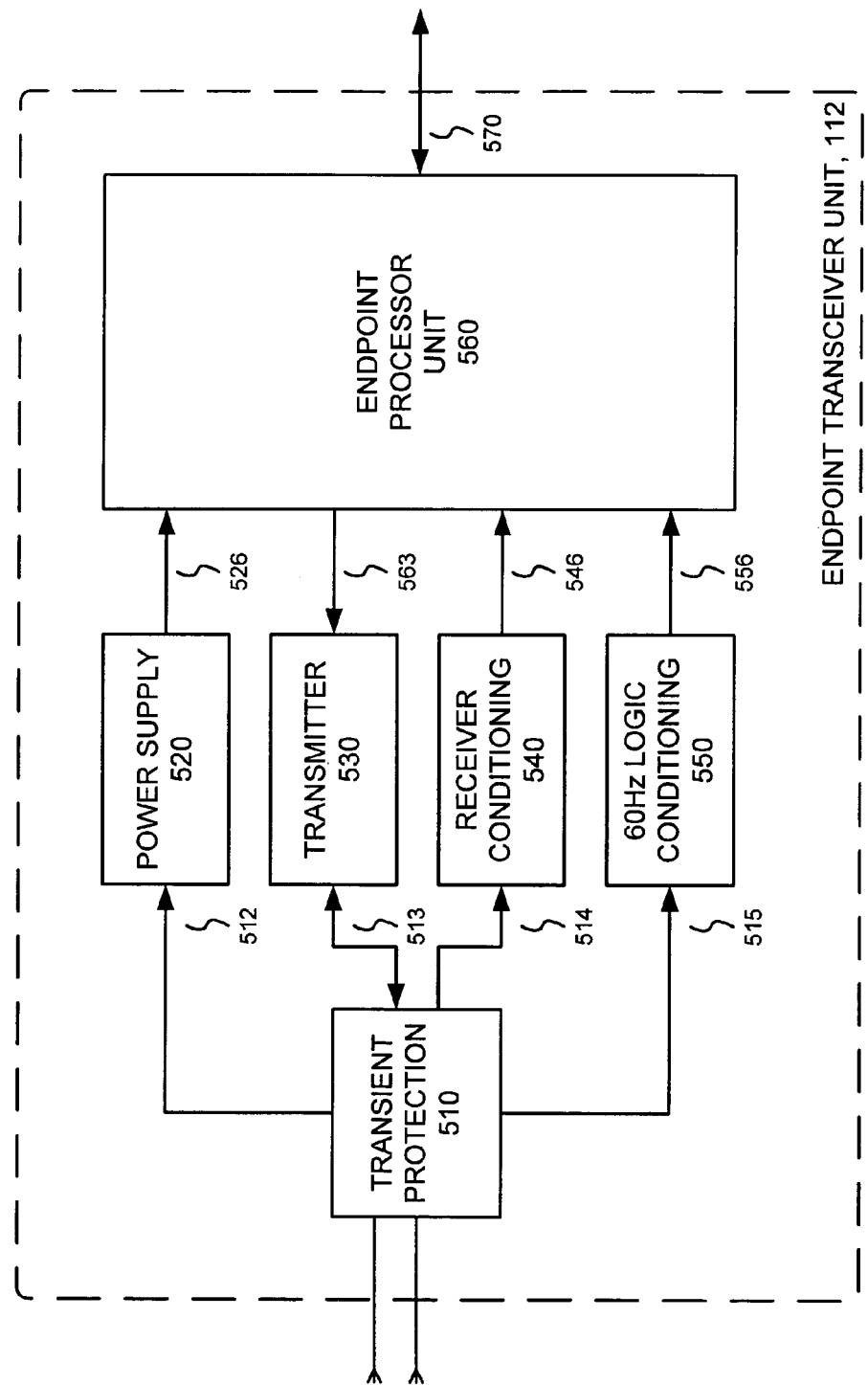
FIG. 5 is a block diagram illustrating functional blocks within an example endpoint transceiver unit that is arranged according to one possible embodiment of the present invention.

FIG. 5 is a block diagram illustrating functional blocks within an example endpoint transceiver unit (112) that is arranged according to one possible embodiment of the present invention. Endpoint transceiver unit 112 includes transient protection block 510, power supply block 520, transmitter 530, receiver conditioning block 540, 60 Hz conditioning logic 550, and endpoint processor unit 560.

Although endpoint transceiver unit 112 is illustrated as a series of discrete functional blocks (510–560), the discrete blocks are separated merely to provide a convenient point of discussion for the functional requirements of the system. The implementation of each of the described functional blocks may be combined or separated into additional blocks without departing from the spirit of the present invention. Moreover, in some implementations it is preferable to combine functional blocks to economize manufacturing costs, reduce power consumption, enhance packaging form factors, maintain noise immunity, as well as other considerations.

Transient protection block 510 is coupled to a power line such as a three-phase power line (see FIG. 3). The transient protection block (510) is arranged to provide transient protection to the endpoint transceiver unit 112. The transient protection block (510) is also arranged to prevent noise, electromagnetic interference (EMI), and other disturbances on the power line from coupling into the endpoint transceiver unit 112.

Power supply block 520 is coupled to a first output of transient protection block 510, and arranged to supply a conditioned power signal to endpoint processor unit 560, which may comprise a controller, microcontroller, or microprocessor based system. Power supply block 520 may also provide signals to additional peripheral devices, as well as additional functions. Example additional functions include: providing a brown-out signal when a brown-out condition is detected, and continuing power signals when the main power signal is interrupted for up to 30 seconds, to name a few. The brown-out signal can be used to reset various circuits, and/or to provide notification to endpoint processor unit 560 that a power-interruption has occurred.

Transmitter block 530 is coupled to a second output of transient protection block 510, and also coupled to an output from endpoint processor unit 560. In operation, transmitter block 530 is configured to encode a data signal, from endpoint processor unit 560, on one or more power lines such that the upstream communication signal may be received by substation 102 from the power lines. Transmitter block 530 may also include various protection and signal conditioning circuits to provide noise immunity and transient surge protection.

In one example, the transmitter is arranged to provide a frequency shift-keyed (FSK) output signal that is responsive to a square wave signal that is provided by endpoint processor unit 560. The square wave signal has a frequency that corresponds to a first frequency when the transmission is encoded with a logic "0" signal and a second frequency when the transmission is encoded with a logic "1" signal. In one example, the first frequency ($f_0$) and the second frequency ($f_1$) are related to one another by a factor of two plus an offset as given by: $f_1=2*f_0+offset$. In another example, the first frequency ($f_0$) and the second frequency ($f_1$) are related to one another by the offset as given by: $f_1=f_0+offset$. In yet another example, the first frequency ($f_0$) and the second frequency ($f_1$) are separated from one another by 1.66 mHz.

Receiver conditioning block 540 is coupled to a third output of transient protection block 510, and also coupled to a first input of endpoint processor unit 560. A downstream communication signal may be provided over one or more power lines by substation 102. Receiver conditioning block 540 is arranged to provide sense signals to endpoint processor unit 560 by conditioning signals on one or more power lines (where a downstream communication signal may be present). The sense signals may be conditioned by: transforming power levels that are acceptable to endpoint processor unit 560, providing anti-alias filtering, and clamping the signal levels to protect various portions of endpoint processor unit 560.

60 Hz logic conditioning block 550 is coupled to a fourth output of transient protection block 510, and also coupled to a second input of endpoint processor unit 560. 60 Hz logic conditioning block 550 is arranged to provide one or more logic signals to endpoint processor unit 560, where each logic signal corresponds to 60 Hz clock signal that is aligned in phase with one of the power signals from the power lines. The logic signals may be conditioned by filtering, current limiting, and level clamping.

Endpoint processor unit 560 includes additional input and output (IO) connections for various peripheral devices. Example IO connection include serial and parallel interface buses, optical interfaces such as IR transmitters and receivers, wired and wireless networking interfaces such as Ethernet, and analog signal interfaces such as an analog-to-digital converter (ADC). In operation, endpoint processor unit 560 is arranged to: coordinate upstream and downstream communications, control external interfaces, provide scheduled data collection and reporting functions at the customer premise, provide demand based data collection and reporting functions, to name a few.

Endpoint Processor Unit

Figure 6:
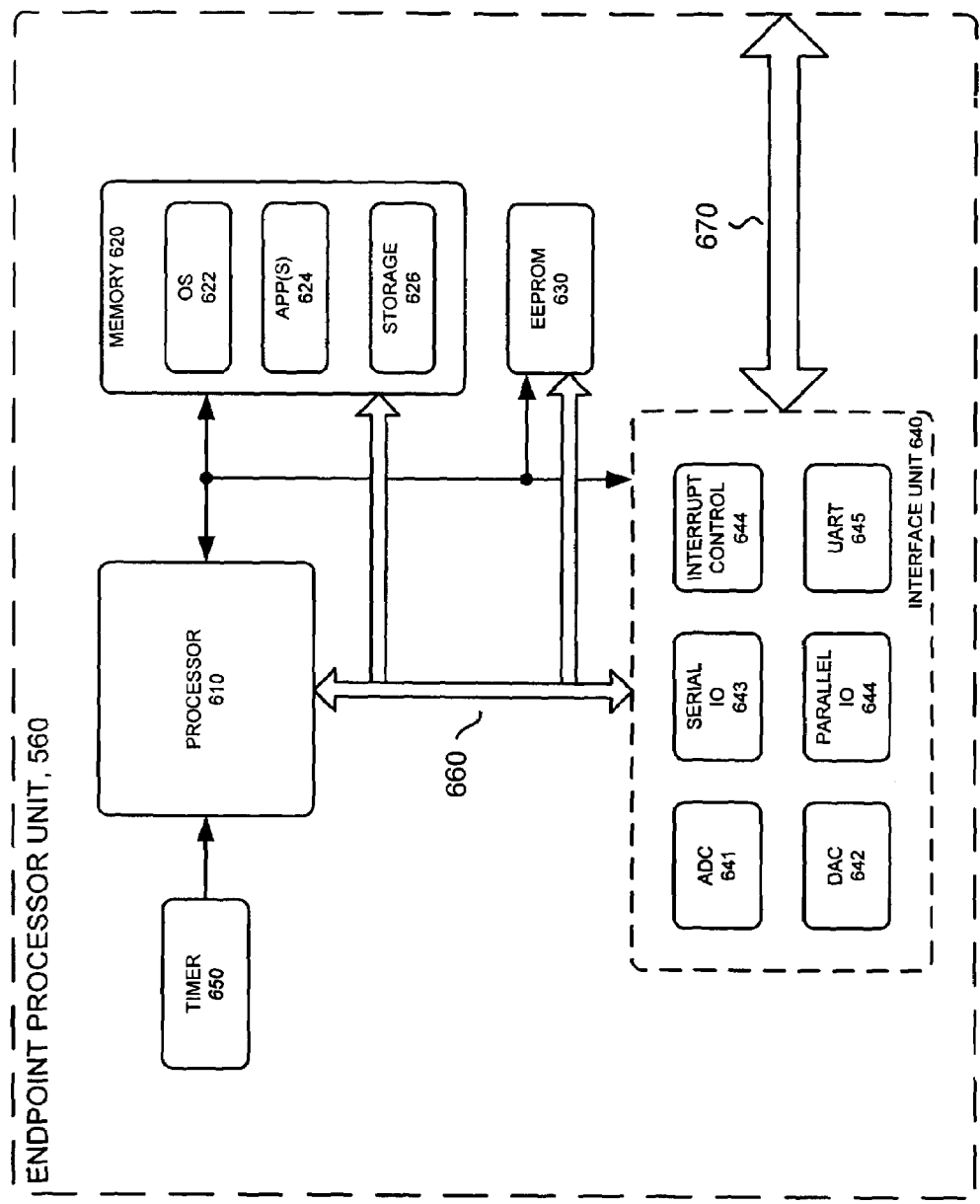
FIG. 6 is a block diagram illustrating functional blocks within an example endpoint processor unit that is arranged according to one possible embodiment of the present invention.

FIG. 6 is a block diagram illustrating functional blocks within an example endpoint processor unit (560) that is arranged according to one possible embodiment of the present invention. In a basic configuration, endpoint processor unit 560 typically includes at least one processor (610), a system memory (620), a programmable memory (630), an interface unit (640), and a timer unit (650).

Processor 610 may comprise a micro-processor, a microcontroller, a custom designed processor, a RISC processor, a CISC processor, a state machine, as well as any other appropriate type of processing unit that is used to control signal flows for the endpoint processor unit (560). The system memory (620) may be volatile (such as RAM), non-volatile (such as static ram, ROM, flash memory, etc.) or some combination of the two. System memory 620 may include an operating system (622); one or more program application modules (624); and may include storage for program data (626). Programmable memory 630 is a non-volatile memory such as an electrically erasable read only memory (EEPROM), or some other type of erasable memory storage unit that maintains storage when power is disabled. Interface unit 640 is a general interface block that may include an analog-to-digital converter (ADC, 641), a digital-to-analog converter (DAC, 642), a serial 10 interface (643), a parallel 10 interface (644), an interrupt control interface (644), and a universal asynchronous receiver and transmitter (UART, 645). The serial IO interface may comprise a universal serial bus interface (USB), an IEEE 1394 interface, and the like. Timer unit 650 is arranged to operate as a watchdog timer that is used by processor unit 610.

Endpoint processor unit 560 may also include additional data storage devices such as, for example, magnetic disks, optical disks, and tape. Computer storage media may include volatile and non-volatile, removable and non-removable media that is implemented in any method or technology for storage of information, such as computer readable instructions, data structures, program modules or other data. System memory 620 and programmable memory 630 are also considered examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by endpoint processor unit 560. Endpoint processor unit 560 may also have input device(s) such as a keyboard, mouse, pen, voice input device, touch input device, etc. Output device(s) such as a display, speakers, printer, etc. may also be included. All these devices are known in the art and need not be discussed at length here.

Processor unit (610) is arranged to control access to system memory (620), programmable memory (630), and the interface unit (640). An internal communication bus (660) is arranged to cooperate with processor unit 610, system memory 620, programmable memory 630, and interface unit 640. An external communication bus (670) is arranged to provide a communication access point to the interface unit (640). The external interface bus (670) may include multiple analog, digital, and optical interface points for the various portions of the interface unit (640). In one example, a field programmer unit (420) is optically linked to the endpoint processor unit (560) via interface unit 640 such that various field programming can be provided to endpoint processor unit 560. Example field programming functions include, but are not limited to, configuration of newly installed endpoints, updating of programs in an existing endpoint, testing various functions on an endpoint, collecting data from an endpoint, and auditing various readings on an endpoint.

Transmitter Clock Generation

Figure 7:
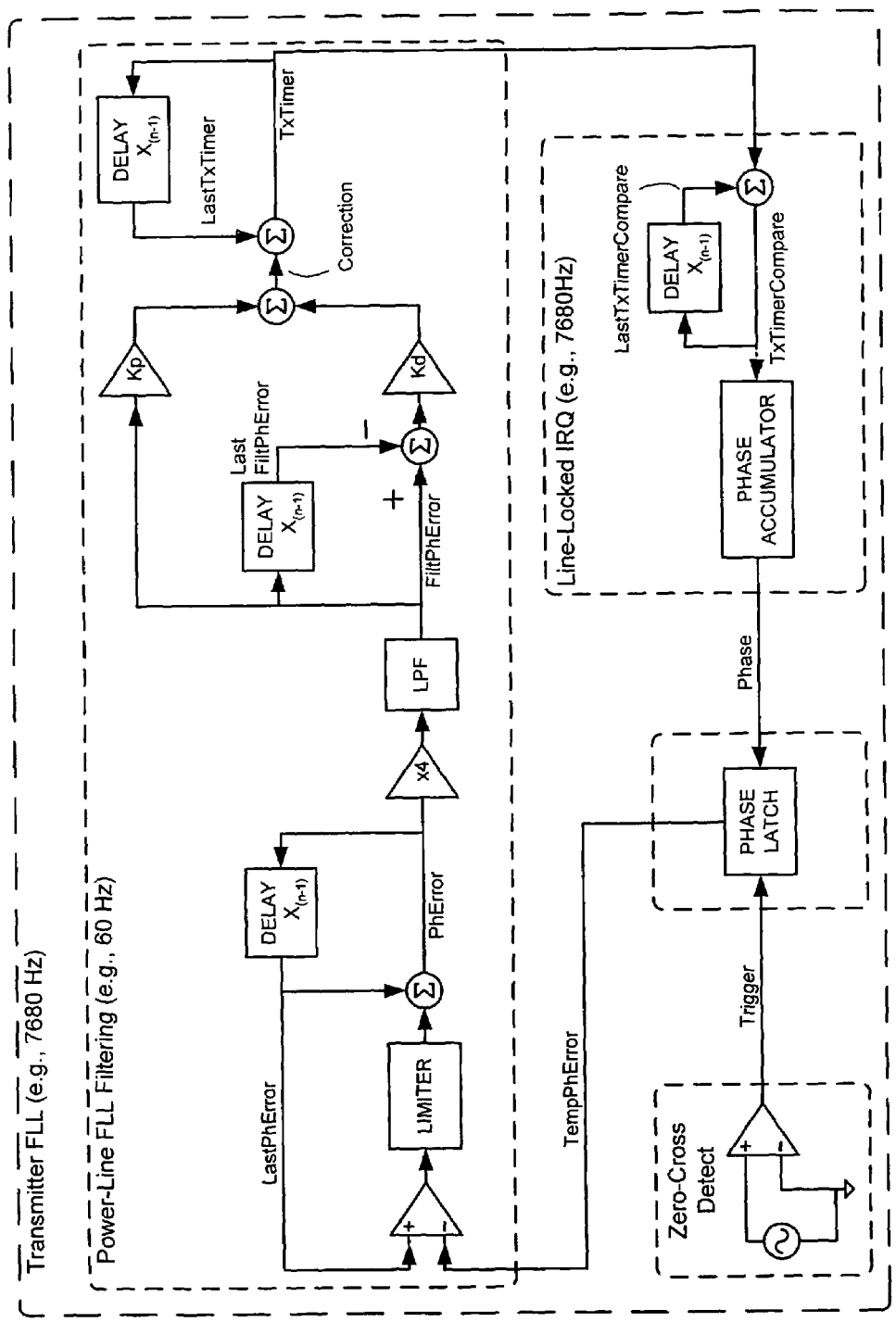
FIG. 7 is a block diagram illustrating the generation of an upstream transmitter clock signal that is arranged according to one possible embodiment of the present invention.

FIG. 7 is a block diagram illustrating the generation of an upstream transmitter clock signal by an endpoint processor unit (560) that is arranged according to one possible embodiment of the present invention. The blocks that are described in FIG. 7 are provided by a combination of hardware and software functions that cooperate to provide clock signals for the transmitter functions in the endpoint.

The upstream transmitter clock has a frequency that is roughly 128 times the power-line frequency, which corresponds to 7680 Hz when the power-line frequency is 60 Hz. A frequency locked loop (FLL) technique is employed to lock the power-line frequency to the transmitter clock frequency using a proportional differential (PD) control loop. The transmitter FLL includes a zero-cross detector, a line locked IRQ generator, a phase latch, and a Power-Line FLL filtering block.

The transmitter FLL is arranged to adjust the transmitter clock frequency by controlling a rate that is associated with interrupt generation via a transmitter timer parameter (TxTimer). A trigger signal (Trigger) is generated by detecting a rising-edge zero crossing with the zero-crossing detector. A phase signal (Phase) is generated by the line-locked IRQ generator, which is responsive to the transmitter timer parameter (TxTimer). The phase signal is interpreted as a signed phase parameter (TempPhError) by the phase latch, which is responsive to the trigger signal (Trigger) and the phase signal (Phase). The Power-Line FLL filtering block is arranged to adjust the transmitter timer parameter (TxTimer) in response to the signed phase parameter (TempPhError). At steady-state, the transmitter timer parameter (TxTimer) is adjusted so that the phase signal (Phase) corresponds to 0 when latched at a rate of 60 Hz (the power-line frequency).

The zero-cross detector is arranged to provide the trigger signal (Trigger) when the signal from the power-line (e.g., power line 302 from FIG. 3) crosses 0 VAC. An example zero-cross detector is included in the 60 Hz logic-conditioning block (550), and is arranged to provide low-pass filtering and clamping functions. The low pass filter function may be implemented as a first order passive RC network with a −3 dB frequency of 113 Hz, while the clamping function may be implemented as diodes that limit the voltage swing to the input of the endpoint processor unit (560). An interrupt can be generated within endpoint processor unit 560 each time the zero-crossing is detected (e.g., 60 Hz). The phase latch is arranged to latch the phase signal (Phase) as a signed phase parameter (TempPhError) each time the zero-crossing is detected. In one example, the signed phase parameter is implemented as an 8-bit signed variable.

The phase signal (Phase) is provided by the line-locked IRQ generator, which includes a phase accumulator, a delay block and a summer block. The summer block is arranged to provide a comparison signal (TxTimerCompare) by adding the transmitter timer parameter (TxTimer) to a last comparison signal. The delay block is configured to receive the comparison signal (TxTimerCompare) and provide a delayed TxTimerCompare signal as the last comparison signal. TxTimer is used by the processor unit (560) to adjust the time interval for the transmitter interrupt via signal TxTimerCompare. The phase accumulator is arranged to provide the phase signal (Phase) by incrementing Phase each time the transmitter timer interrupt occurs (e.g., 7680 Hz).

The Power-Line FLL filtering block includes a comparator block, four summer blocks, three delay blocks, three gain blocks, a limiter block, and a low pass filter block. The blocks are arranged as a proportional integral/derivative (PID) control loop, without the integration portion such that the control loop is a PD loop. The last phase error (LastPhError) is compared to the incoming temporary phase error (TempPhError) by the comparator block. The output of the comparator is limited by the limiter block such that the magnitude of the errors from overshoot and undershoot are damped to prevent oscillations in the control loop. The output of the limiter is combined with LastPhError by the first summer block to provide the current phase error signal (PhError). The output of the comparator is limited to a value such as +/−1 by the limiter. For this example, the current phase error (PhError) is incremented by one when LastPhError is greater than TempPhError, and decremented by one when the LastPhError is less than TempPhError. PhError is provided to the first delay bock and the first gain block. The first delay block generates the last phase error signal (LastPhError).

The phase error signal (PhError) is provided to the first gain block and the low pass filter (LPF) block, where the gain is increased by the first gain block to account for attenuation from the LPF block. The LPF block provides the filtered error signal (FiltPhError) according to an IIR filter. In one example, the filter output is given by the expression: FilterVal=(RawVal−LastFilterVal)/FILTER, where FILTER is a filter coefficient with a value of 8. For this example, the LPF provides a cutoff frequency corresponding to: $f_c=(-60/2\pi)*\ln(1-(1/8))=1.275$ Hz, where 60 corresponds to the sampling rate for a 60 Hz line frequency, and where 8 is the filter coefficient.

The filtered error signal (FiltPhError) is provided to a second delay block, a second summer, and a second gain block. The second delay block provides a last filtered error signal (LastFiltPhError), which is subtracted from the current filtered error signal (FiltPhError) by the second summer block. The second gain block is arranged to provide the proportional signal with a gain of Kp (e.g., Kp=16), while the third gain block is arranged to provide the differential signal with a gain of Kd (e.g., Kd=2048). The third summer provides a correction signal by combining the proportional and differential signals. The fourth summer block is arranged to provide TxTimer by combining the correction signal with the last value for TxTimer (LastTxTimer), which is provided by the third delay block. The adjusted timer parameter is given by TxTimer=LastTxTimer+Correction.

The timer parameter (TxTimer) is used to adjust the IRQ interrupt time interval for the transmitter interrupt via the line-locked IRQ block. Each time the transmitter interrupt occurs (e.g., every 7680 Hz), the phase signal is incremented by a predetermined amount (e.g., +2). The phase signal (Phase) corresponds to zero when the transmitter timer signal (e.g., 7680 Hz) is locked to the power-line signal (e.g., 60 Hz). A positive error is observable when the phase error is in a first range (e.g., 0x02 through 0x7E for an 8 bit phase value). A negative error is observable when the phase error is in a second range (e.g., 0x80 through 0xFE for an 8 bit phase value). A positive error is observable when more interrupts are generated than required to lock the frequency to the line frequency (e.g., 60 Hz). TxTimer is decreased when too many interrupts are generated. A negative error is observable when fewer interrupts are generated than required to lock the frequency to the line frequency (e.g., 60 Hz). TxTimer is increased when not enough interrupts are generated.

Receiver Clock Generation

Figure 8:
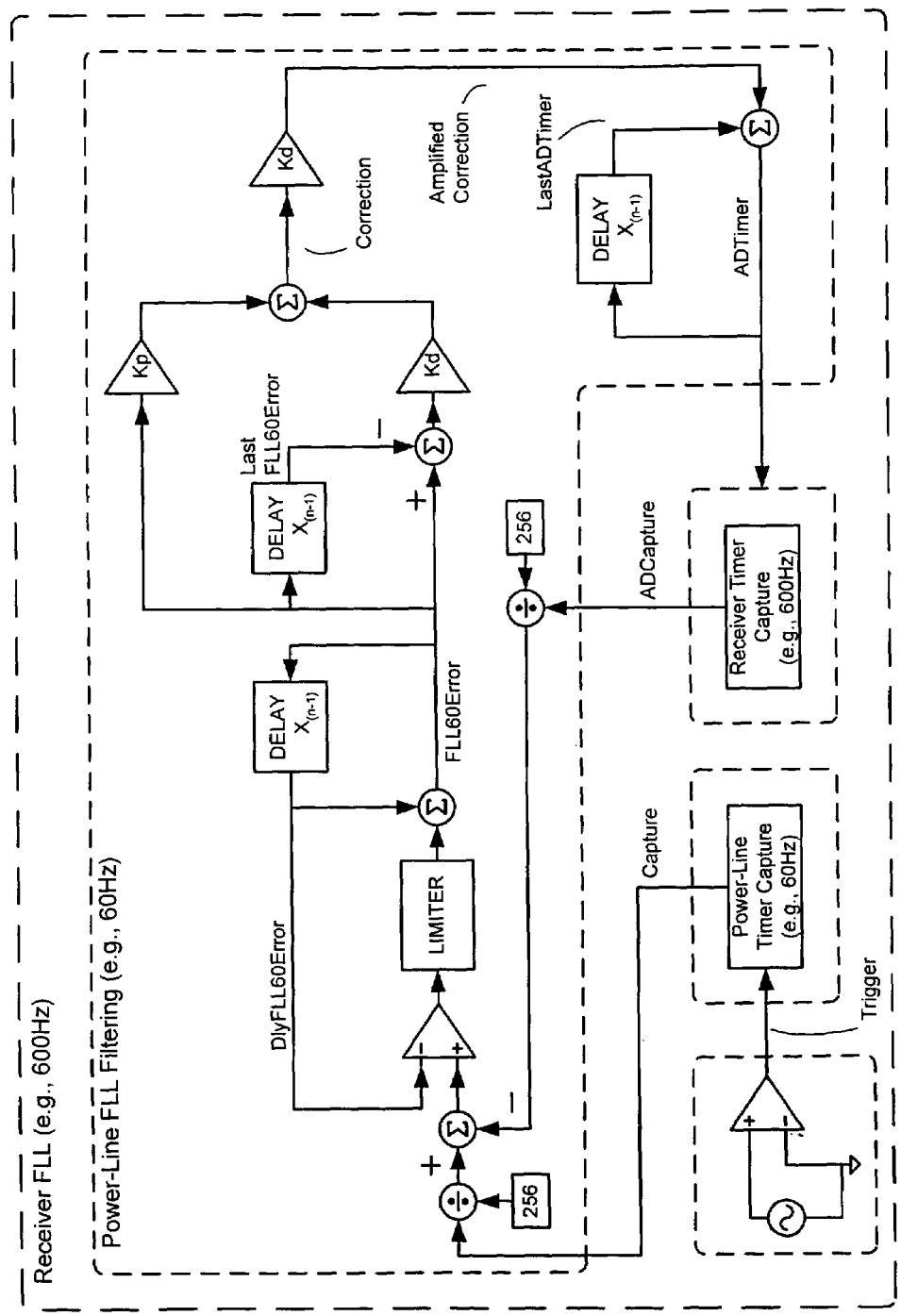
FIG. 8 is a block diagram illustrating the generation of a downstream receiver clock signal that is arranged according to one possible embodiment of the present invention.

FIG. 8 is a block diagram illustrating the generation of a downstream receiver clock signal by an endpoint processor unit (560) that is arranged according to one possible embodiment of the present invention. The blocks that are described in FIG. 8 are provided by a combination of hardware and software functions that cooperate to provide clock signals for the transmitter functions in the endpoint.

The downstream receiver clock has a frequency that is roughly ten (10) times the power-line frequency, which corresponds to 600 Hz when the power-line frequency is 60 Hz. Similar to the transmitter clock generator, a frequency locked loop (FLL) technique is employed to lock the power-line frequency to the receiver clock frequency using a proportional differential (PD) control loop. The Receiver FLL includes a zero-cross detector, a power-line timer capture block, a receiver timer capture block, and a power-line FLL filtering block.

The receiver FLL is arranged to adjust the receiver clock frequency by controlling a rate that is associated with interrupt generation via a receiver timer parameter (AD-Timer). A trigger signal (Trigger) is generated by detecting a rising-edge zero crossing with the zero-crossing detector. A captured timer signal (Capture) is generated by the power-line timer capture block. The captured timer signal (Capture) corresponds to a sample from a free-running clock, which is sampled when the zero crossing is detected via the trigger signal (Trigger). Another captured timer signal (ADCapture) is generated by the receiver timer capture block after every tenth occurrence of the receiver interrupt cycle. The capture signals are received by the power-line FLL filtering block, which is arranged to adjust the interrupt interval for the receiver clock by adjusting the receiver timer parameter (ADTimer). At steady-state, the receiver timer parameter (ADTimer) is adjusted so that the receiver timer interrupt interval (e.g., 600 Hz) is locked to the power-line frequency (e.g., 60 Hz) by a factor of ten.

The zero-cross detector is arranged to provide the trigger signal (Trigger) when the signal from the power-line (e.g., power line 302 from FIG. 3) crosses 0 VAC. An example zero-cross detector is included in the 60 Hz logic-conditioning block (550), and is arranged to provide low-pass filtering and clamping functions. The low pass filter function may be implemented as a first order passive RC network with a −3 dB frequency of 113 Hz, while the clamping function may be implemented as diodes that limit the voltage swing to the input of the endpoint processor unit (560). An interrupt can be generated within endpoint processor unit 560 each time the zero-crossing is detected (e.g., 60 Hz). The power-line timer capture block is arranged to capture the timer signal from a free-running clock as a captured timer signal (Capture) each time the zero-crossing is detected. In one example, the timer is a free running 16 bit timer that is operated at a frequency of 2 MHz, which is locked by a crystal oscillator for endpoint processor unit 560.

The power-line FLL filtering block includes two divider blocks, five summer blocks, a comparator block, three delay blocks, a limiter block and three gain blocks. The blocks are arranged as a proportional derivative (PD) control loop that is similar to that described previously with respect to FIG. 7. The divider blocks and the first summer block are arranged to find the difference between the high bytes of the captured timer signal (Capture) the other captured timer signal (AdCapture), which is provided to the comparator block. The comparator block compares the difference to the delayed error signal (DlyFLL60Error). The output of the comparator is limited by the limiter block such that the magnitude of the errors from overshoot and undershoot are damped to prevent oscillations in the control loop. The output of the limiter is combined with the delayed error signal (DlyFLL60Error) by the second summer block to provide the error signal (FLL60Error). The output of the comparator is limited to a value such as ±1 by the limiter. For this example, the current error signal (FLL60Error) is incremented by one when the difference in the high bytes of the captured timer signals is greater than DlyFLL60Error, and decremented by one when the difference in the high bytes of the captured timer signals is less than DlyFLL60Error. FLL60Error is provided to the first delay bock, which generates the delayed error signal (DlyFLL60Error).

The error signal (FLL60Error) is provided to the first gain block, the second delay block, and to the second gain block via the third summer block. The second delay block provides a last error signal (LastFLL60Error), which is subtracted from the current error signal (FLL60Error) by the third summer block. The first gain block is arranged to provide the proportional signal with a gain of Kp (e.g., Kp=256), while the second gain block is arranged to provide the differential signal with a gain of Kd (e.g., Kd=4096). The fourth summer provides a correction signal by combining the proportional and differential signals. A third gain block amplifies the correction signal by Kc (e.g. Kc=4) to provide an amplified correction signal. The fifth summer block is arranged to provide ADTimer by combining the amplified correction signal with the last value for ADTimer (LastADTimer), which is provided by the third delay block. The receiver timer parameter is given by: ADTimer=LastADTimer+Correction.

The receiver timer parameter (ADTimer) is used to adjust the IRQ interrupt time interval for the receiver interrupt by comparing the captured timer signals and providing a difference signal to an input of the comparator. FLL60Error is incremented when the delayed error signal (DlyFLL60Error) is less than the difference signal, and decremented when the delayed error signal (DlyFLL60Error) is greater than the difference signal. The lower bytes of the captured signals were discarded by the divider blocks to dampen the response of the overall control loop to prevent oscillations and overcorrection.

Downstream Processing

Figure 9:
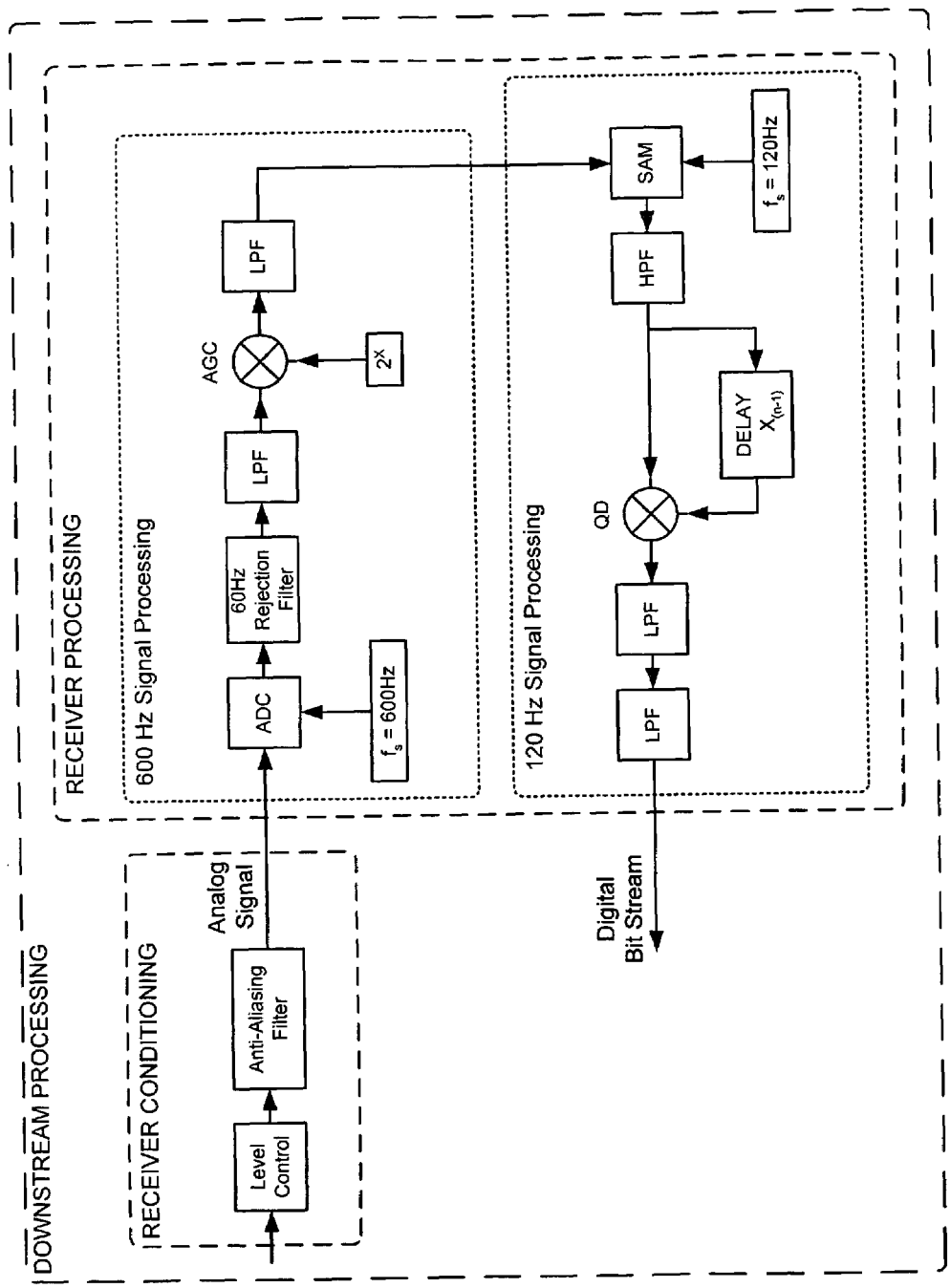
FIG. 9 is a block diagram illustrating downstream reception by an endpoint that is arranged according to one possible embodiment of the present invention.

FIG. 9 is a block diagram illustrating downstream reception by an endpoint that is arranged according to one possible embodiment of the present invention. Downstream processing is handled by a receiver conditioning block and a receiver processing block.

The receiver conditioning block is arranged to provide input level control and filtering of the signals for the receiver processing block. The received conditioning block includes a level control block, and an anti-aliasing filter block. The level control block is arranged to receive the line voltage from one of the power-lines and provide an attenuated signal to the anti-aliasing block. The attenuated signal may also be buffered. The anti-aliasing filter is configured to receive the attenuated signal and provide a filtered signal. The anti-aliasing filter rejects signals that are above the downstream signaling frequencies. In one example, the anti-aliasing filter is a band-pass filter that has a center frequency that is centered on the modulation frequencies (e.g., centered at 570 Hz for a two tone modulation scheme using 555 Hz and 585 Hz).

The receiver processing block is arranged to extract a digital bit stream from the analog signal. The receiver processing block includes two signal processing blocks (a 600 Hz signal processing block and a 120 Hz signal processing block). The first signal processing block (e.g., 600 Hz signal processing) includes an analog-to-digital converter (ADC), a power-line rejection filter (e.g., 60 Hz rejection), a first low pass filter (LPF) block, an automatic gain control block (AGC) and a second low pass filter block. The second signal processing block (e.g., 120 Hz signal processing) includes a sampling block, a high pass filter block, a delay block, a quadrature detector block, and two low pass filter blocks.

The ADC block is arranged to sample the analog signal at a rate of ten times (10x) the frequency of the power-line (e.g., 600 Hz for a line frequency of 60 Hz). The ADC block is operated in an under-sampled mode to provide down conversion of the signals to base-band. In one example, the sampling rate is 600 Hz, and the modulated signals are provide at frequencies of 555 Hz and 585 Hz . For this example, the under-sampled operation provides down conversion to base-band frequencies of 15 Hz and 45 Hz.

The 60 Hz rejection filter is arranged to reject frequencies and harmonics that are associated with the power line. In one example the 60 Hz rejection filter is an inverse comb filter that is implemented as a circular buffer that holds the last ten samples and subtracts each new sample from the $10^{th}$ previous sample such that the remaining signal removes 60 Hz components. The first low pass filter is arranged to reject the higher order frequencies that may be present after the under-sampling technique is applied. In one example, the first low pass filter has a corner frequency of 66 Hz. The output of the first low pass filter is coupled to the AGC block, which boosts the signal level without clipping. The output of the AGC block is provided to the second low pass filter block, which again rejects any higher order frequencies. The second low pass filter provides a filtered 600 Hz signal to the 120 Hz signal processing block.

The filtered 600 Hz signal is re-sampled at a rate of 120 Hz (twice the power-line frequency) by the sampling block, and then passed through the high pass filter block. The output of the high-pass filter block is provided to the quadrature detector block and the delay block, which is also coupled to the quadrature detector block. The output of the quadrature detector block is coupled to the second low pass filter block, which is coupled to the third low pass filter block. The output of the third low pass filter block corresponds to the recovered digital bit stream. The second signal processing block (e.g., 120 Hz signal processing) detects the presence of the base-band signals (e.g., 15 Hz and 45 Hz) by sampling the points 90degrees apart from a 30 Hz carrier with the quadrature detector. The result is proportional to the frequency deviation from the carrier. The detected digital bit stream is encoded in an NRZI scheme, where logic "1" corresponds to a change in the modulation frequency and logic "0" corresponds to no change in the modulation frequency. The incoming digital bit stream is buffered by the endpoint for further processing.

Upstream Processing

Figure 10:
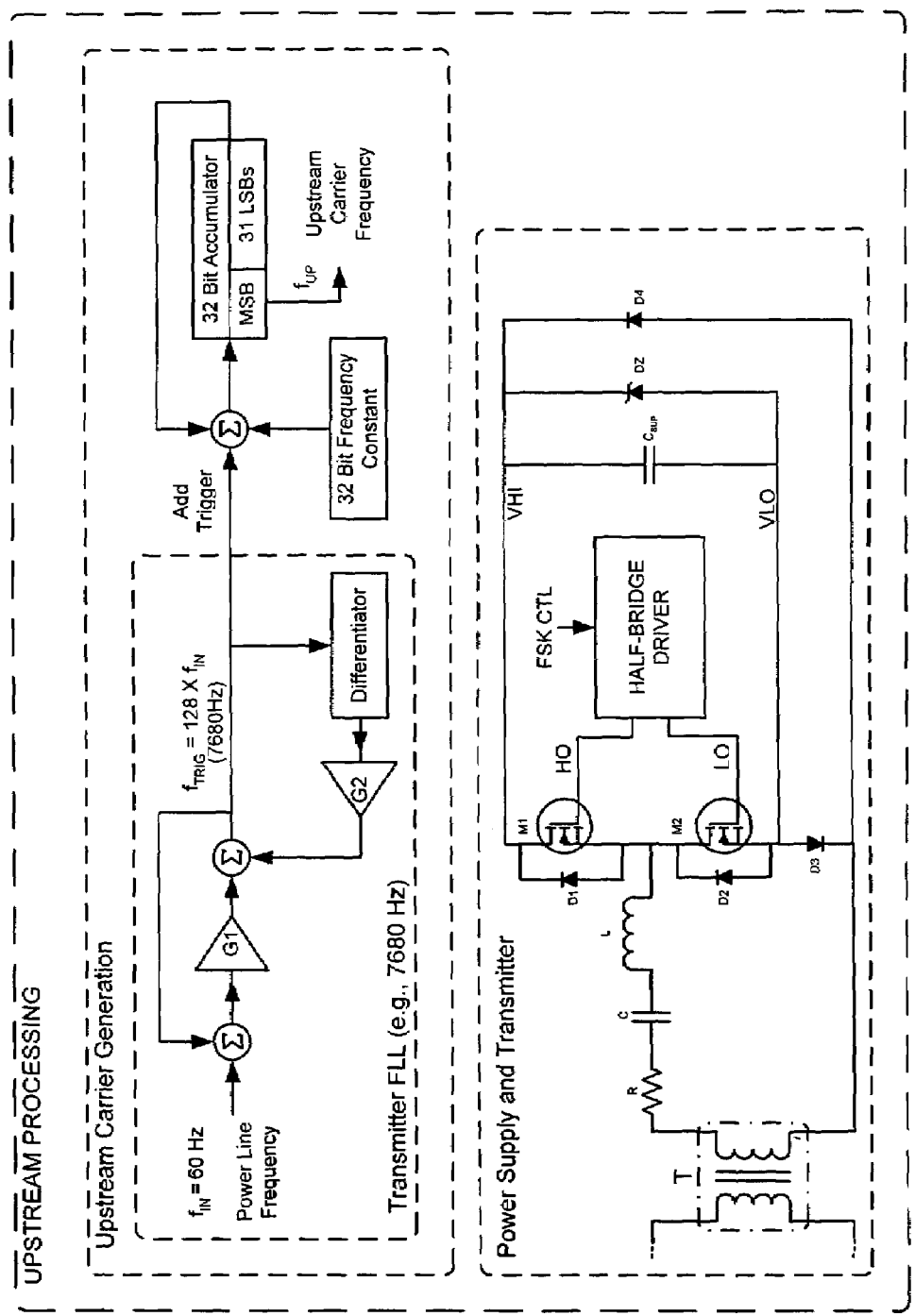
FIG. 10 is a block diagram illustrating transmission processing and power supply generation by an endpoint that is arranged according to one possible embodiment of the present invention.

FIG. 10 is a block diagram illustrating transmission processing and power supply generation by an endpoint that is arranged according to one possible embodiment of the present invention. Upstream processing is handled by an upstream carrier generation block, and a power supply and transmitter block.

The upstream carrier generation block includes the transmitter FLL that was described with respect to FIG. 7, a summer, and an accumulator. The summer block is triggered by the upstream transmitter clock interrupt (Add Trigger). The summer block adds a constant (e.g., a 32 bit constant) to the accumulator (e.g., a 32 bit accumulator). The most significant bit (MSB) of the accumulator will toggle at a rate that corresponds to the desired power-line locked frequency, and is used to directly drive the carrier circuitry in the transmitter. The constant is changed according to the desired data transmission to alter the FSK modulation frequency from logic 1 to logic 0.

The power supply and transmitter block includes a pair of drivers (M1, M2) a half bridge driver block, two capacitors (C, $C_{SUP}$), four diodes (D1–D4), a zener diode (DZ), an inductor (L), and a transformer. The power supply and transmitter block is arranged to provide a local power supply for various portions of the endpoint from the VHI and VLO terminals, and simultaneously provide the upstream signal. Transformer T is arranged to couple power from the power-line to the power supply portion of the circuit, and also couples modulated data from the transmitter portion of the circuit to the power-line.

The power-line oscillates at a line frequency (e.g., 60 Hz) that has a positive current polarity during a first time interval and a negative current polarity during a second time interval. Resistor R, inductor L and capacitor C form a resonant circuit that is driven by drivers M1 and M2 in response to the FSK control signal (FSK CTL). Activation of driver M1 during the first time interval (the positive half cycle) will charge capacitor $C_{SUP}$, while activation of driver M2 during the first time interval will shunt the current to diode D3 from the resonant circuit. Activation of driver M1 during the second time interval (the negative half cycle) will shunt current from D4 to the resonant circuit, while activation of driver M2 during the second time interval will charge capacitor $C_{SUP}$. Csup will discharge at the zero crossings.

A local power supply is initially generated across capacitor $C_{SUP}$ as follows below. Diodes D1 and D2 provide a current path to charge capacitor $C_{SUP}$. During the first time interval (the positive half cycle), current from transformer T is coupled through resistor R, capacitor C, inductor L, and diode D1 to the top plate of capacitor $C_{SUP}$, and returning to the transformer from the bottom plate of capacitor $C_{SUP}$ through diode D3. During the second time interval (the positive half cycle), current from transformer T is coupled through diode D4 to the top plate of capacitor C4, and returning to transformer T from the bottom plate of capacitor $C_{SUP}$ through diode D2, inductor L, capacitor C, and resistor R. Capacitor $C_{SUP}$ will continue to charge up through repeated cycling of the power-line oscillation until the voltage across the capacitor is clamped by zener diode DZ. After the VHI and VLO power supply levels are generated across $C_{SUP}$, the half-bridge driver can be operated to provide modulated signals on the power line.

The resonant circuit has a resonant frequency that is centered around 1500 Hz. A square wave signal with a 50% duty cycle can be generated with the half-bridge driver in a range from 970 Hz to 1006 Hz, which is one example range for the desired carrier frequencies of an FSK signal. The resonant circuit filters the square wave signal so that activation of driver M1 results in a positive half cycle of current at the carrier frequency while activation of driver M2 results in a negative half cycle of current. The carrier signal is coupled through transformer T1 onto the power-line. By selective activation of the FSK control signal (FSK CTL) the square wave frequency is modulated. As described previously, the upstream carrier frequency is modulated by a numerical oscillator that is implemented, for example, by the accumulator in the upstream carrier generation block. Changing the frequency constant will change the numerical oscillation rate, which in turn will change the modulation rate of the half-bridge driver.

Endpoint Processing

Figure 11:
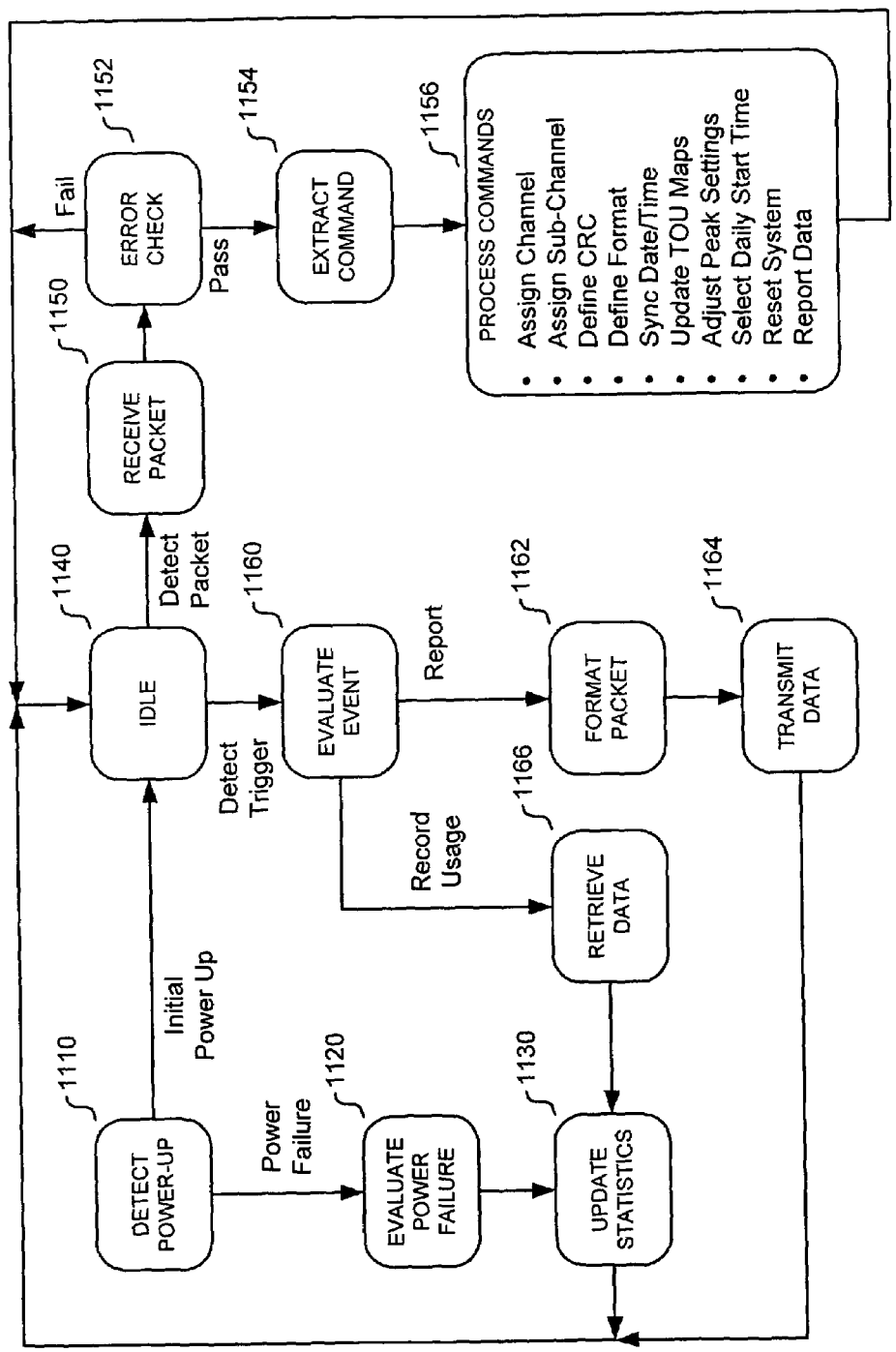
FIG. 11 is a state diagram illustrating internal processing for an endpoint processor unit that is arranged according to one possible embodiment of the present invention.

FIG. 11 is a state diagram (1100) illustrating internal processing for an endpoint processor unit that is arranged according to one possible embodiment of the present invention. Processing is initiated by a power-up sequence at block 1110.

At processing block 1110, the power-up condition is detected and evaluated. The power-up condition will have a status corresponding to one of two conditions: either the endpoint is being powered up for the first time, or a power failure occurred. Processing continues from block 1110 to block 1120 when a power failure is detected. Alternatively, processing continues from block 1110 to block 1140 when an initial power-up condition is detected.

The power failure condition is evaluated at block 1120 to perform diagnostics and data collection at the endpoint. The power interruption may be categorized as a momentary interruption, a momentary event interruption, or a sustained interruption. A momentary interruption is a temporary power interruption that occurs for less than roughly 30 seconds. A momentary event interruption corresponds to the occurrence of two or more momentary interruptions over a predefined period such as 5 minutes. A sustained interruption is a power interruption that occurs for an extended period of time such as greater than 30 seconds. Each endpoint can collect data such as time and date of the power interruption along with the type of interruption. Processing continues from block 1120 to block 1130.

Statistical data is updated at block 1130. The statistical data may correspond to meter readings, power interruption statistics, as well as other diagnostics data. In one example, the data collected from a power outage is recorded as well as cumulative statistics for each type of power interruption based on total time for power interruption based on interruption type. In another example, statistics are updated by recording metered usage and calculating various statistics such as such as average load, peak load, total power usage, where each type of metered reading can be categorized by time of use (e.g., day of the week, time of the day, etc.). Processing continues from block 1130 to block 1140.

Block 1140 corresponds to an idle block, where the endpoint processing unit is idle waiting for an event to occur. Events can be scheduled events or triggered events. An event may be scheduled with the endpoint processor unit by criteria such as, for example, time and date. The endpoint processor unit can continue to collect metering data while in the idle block. Processing continues from block 1140 to block 1150 when a packet is detected from either the power line or some peripheral device. Alternatively, processing continues from block 1140 to block 1160 when a triggered event is detected.

The triggered event is evaluated at block 1160. The triggered event may be the result of any number of conditions including, but not limited to: detecting a power failure, detecting a received packet from a distribution substation, receiving a command sequence from a distribution substation, a recorded metering condition such as power usage exceeding a threshold, an internal diagnostic failure, detecting a connection of a peripheral device such as a field programmer, as well as others. Processing continues from block 1160 to block 1162 when the trigger event corresponds to a reporting interval. Alternatively, processing continues from block 1160 to block 1166 when the trigger event corresponds to a record usage interval.

A reporting interval begins at block 1162 by collecting data and formatting the data according to the upstream transmission protocol, which is organized as packets. After the packets are formatted for transmission, the packet is placed in a queue for transmission according to the transmission methodology that was previously described. Processing continues from block 1162 to block 1164, where the transmission of the packet or packets begins. Processing flows from block 1164 to block 1140. Since upstream data transmissions occur at a very slow rate (e.g., approximately 20 minutes per bit), packet transmissions may continue as a background process where the bit value is periodically changed in the ongoing transmission over an extended period of time.

Usage data is recorded by retrieving data from various metering mechanisms at block 1166. Metering mechanisms may include an optical reader that evaluates the black and white levels on metering disks in a utility meter, a register in the endpoint processor unit that stores statistical data, a value that is stored in system memory of the endpoint processor unit, a value that is stored in non-volatile memory of the endpoint processor unit, and other devices that may peripherally interface with the endpoint processor unit. Processing continues from block 1166 to block 1130 where the statistical data is updated according to the new reading and/or calculations.

At block 1150, a packet is retrieved by the endpoint processor unit from a storage location such as, for example, system memory, a register, or non-volatile memory. Proceeding to block 1152, the received packet is evaluated for errors. Processing continues from block 1152 to either an error trap (not shown) or to block 1140 when the received packet fails the error check. Alternatively, processing continues from block 1152 to block 1154 when the received packet passes the error check. A command is extracted from the packet at block 1154. Continuing to block 1156, the extracted command is evaluated and processed. Processing returns to block 1140 after the extracted command is processed.

Example commands include: assignment of a channel for upstream data transmissions, assignment of a substation for upstream data transmission, definitions for a CRC check, definitions for packet formats in the upstream protocol, synchronization of the current data and time, updating time of use (TOU) maps for the endpoint, adjusting peak settings, selecting a daily start time for a reporting interval, resetting the endpoint, and a demand based request for a data report, as well as others. Demand metering can be initiated by a command packet from a distribution substation, or from a peripheral device such as a field programming unit. Demand metering is asynchronous to the automatic data collections that correspond to scheduled events.

Time of use metering can be performed by the endpoint according to one or more time of use (TOU) maps. TOU maps can be organized according to three different day types: weekdays, Saturday, and Sunday. Power usage can be divided into multiple time intervals over the course of a day, where each time interval corresponds to a data collection bucket. A schedule of buckets and day types constitute a TOU map, which may span an entire week. An endpoint can be scheduled to change between TOU maps based on various criteria by the utility company such as consumer type: home or business, holiday schedule, as well as others. TOU maps can be changed in an endpoint by an override command, or according to a scheduled event. TOU maps can be used by the utility company to apply different billing rates based on the TOU map, to schedule data collection for various usage and load management evaluations, as well as any other purpose.

Example Upstream Protocol

Figure 12:
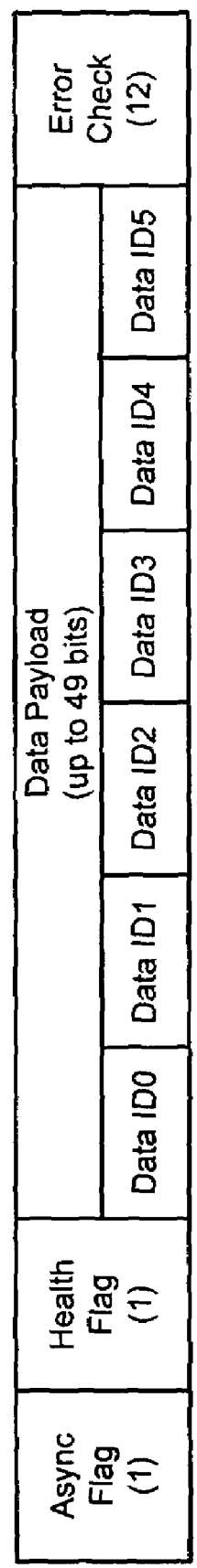
FIG. 12 is a diagram illustrating an upstream packet format for an endpoint that is arranged according to one possible embodiment of the present invention.

FIG. 12 is a diagram illustrating an upstream packet format for an endpoint that is arranged according to one possible embodiment of the present invention. As illustrated in the figure, the packet includes fields for: a 1-bit asynchronous flag field, a 1-bit health flag, a multi-bit data payload (e.g., up to 49 bits), and a 12-bit error check and detection. Each endpoint includes a packet sequence definition table that defines the formats for various data payload formats in the packet. The asynchronous flag is set to 1 when the packet does not conform to one of the packet sequence definitions found in the table; otherwise the asynchronous flag is set to 0. The health flag is set to 1 when the endpoint fails one or more internal diagnostic tests, otherwise the health flag is set to 0. The data payload is a flexibly defined payload that is mapped to various packet sequence definitions as will be describe below.

The packet can include a sequence of up to six (6) chunks of data, where each chunk is associated with a particular data identifier (DataID). Each endpoint can have up to seven defined packet types that are identified by the sequence number (SeqNum). Each sequence is defined by a set of data identifiers (DataIDs) and a number of bits (NumBits) that is associated with each data identifier, respectively. For example, a sequence that includes six chunks is defined by six data identifier variables (DataID0–DataID5) and six corresponding number of bits variables (NumBits0–NumBits5). The packet sequences are determined by a 7×12 structure of 8-bit data identifiers (DataIDs) with 5-bit number of bits attributes (NumBits). The packet sequences can be changed by: the receipt of a downstream communication with a command, the receipt of a configuration command via a field programming unit, or some other configuration mechanism.

Each packet sequence is associated with a particular day of the week (DayOfWeek) by the sequence number (e.g., sequence 0 is scheduled for Sunday, sequence 1 for Monday, etc.). The packet is assembled as defined in the packet sequence including the asynchronous bit, health flag, payload data, and error correction and detection bits. A data identifier corresponding to zero indicates that the particular chunk of data is null and a series of 1's will be transmitted. At a designated time (e.g., PacketStartTime), the assembled packet will be transmitted by the endpoint as an upstream communication.

Tables 1–4 illustrate various parameters for an endpoint processor unit that is arranged according to one possible embodiment of the present invention. The payload data is scheduled for transmission as a series of references to data identifiers that are identified by 8-bit data identifiers (DataIDs), where each DataID is associated with the corresponding endpoint parameter.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

We claim:

1. An apparatus for transmitting data to a distribution substation, wherein the distribution substation is configured to receive encoded data in a power signal on a distribution line in a power distribution network, the apparatus comprising:
   a transformer that includes a primary winding that is coupled to the distribution line and a secondary winding that is coupled between a first node and a second node;
   a half-bridge drive circuit that is configured to selectively assert a first drive signal and second drive signal in response to a control signal;
   a first driver that is coupled between a first power-supply node and a common node, wherein the first driver is arranged to couple the first power-supply node to the common node when the first drive signal is asserted;
   a second driver that is coupled between the common node and a second power-supply node, wherein the second driver is arranged to couple the common node to the second power-supply node when the second drive signal is asserted; and
   a resonant circuit that is coupled between the first node and the common node, wherein the resonant circuit has a natural resonant frequency in an audio frequency range, and wherein the half-bridge driver is arranged to selectively activate the first and second drivers such that the distribution line is modulated with a square-wave signal at a frequency that is associated with the encoded data.

2. The apparatus of claim 1, wherein the resonant circuit comprises a series combination of a resistor, a capacitor, and an inductor.

3. The apparatus of claim 1, wherein the square-wave signal has a frequency that is approximately in arrange from 970 Hz to 1006 Hz.

4. The apparatus of claim 1, wherein the square-wave signal has a frequency that is selectively changed between two frequencies via the control signal such that the encoded data corresponds to a frequency shift keyed (FSK) modulated signal.

5. The apparatus of claim 1, further comprising a transmitter carrier generator block, wherein the transmitter carrier generator block is arranged to:
   increase a phase signal when an interrupt occurs, capture a temporary phase error signal from the phase signal when a zero-crossing is detected in the power signal, compare the temporary phase error signal to a last phase error signal, increase a phase error signal when the last phase error signal is greater than the temporary phase error signal, filter the phase error signal to provide a filtered phase error signal, calculate a correction signal from the filtered phase error signal using a proportional gain block and a differential gain block, and adjust a time interval associated with the interrupt in response to the correction signal.

6. The apparatus of claim 1, further comprising:
   an upstream carrier generation block that is arranged to provide a trigger clock signal in response to the power signal such that the trigger clock signal is locked to a frequency that corresponds to approximately 128 times another frequency that is associated with the power signal; and a numerical oscillator that is responsive to the trigger clock, wherein the numerical oscillator is arranged to toggle between a digital bit at a rate that is associated with a transmitter frequency.

7. The apparatus of claim 6, the numerical oscillator comprising:
an accumulator block that is arranged to store a value; and
a summer block that is arranged to increase the value stored in the accumulator by a constant when triggered by the trigger clock, wherein at least one output of the accumulator block is employed to generate the digital bit such that the transmitter frequency is changed by changing the constant.

8. The apparatus of claim 6, further comprising an end-point processor unit is arranged to selectively adjust the constant in the numerical oscillator to encode data in the power signal.

9. An apparatus for supplying power to an endpoint from a power signal on a distribution line in a power distribution network that receives power from high voltage power lines, the apparatus comprising:
a transformer that steps down the power from the distribution line to a voltage level that is useful by the endpoint at a premises that includes a primary winding that is coupled to the distribution line and a secondary winding that is coupled between a first node and a second node;
a first diode circuit that is coupled between a first power-supply node and the a common node;
a second diode circuit that is coupled between the common node and a second power-supply node;
a third diode circuit that is coupled between the second node and the second power-supply node;
a fourth diode circuit that is coupled between the first power-supply node and the second node; and
a capacitor circuit that is coupled between the first power-supply node and the second power-supply node.

10. The apparatus of claim 9, further comprising a resonant circuit, wherein the secondary winding of the transformer is coupled to the common node through the resonant circuit.

11. The apparatus of claim 9, further comprising: a zener diode circuit that is coupled between the first power-supply node and the second power-supply node.

12. The apparatus of claim 9, wherein the apparatus is further arranged such that a top plate of the capacitor circuit is coupled to the first node through the first diode and resonant circuit when the power signal has a first polarity, a bottom plate of the capacitor circuit is coupled to the second node through the third diode circuit when the power signal has the first polarity, the top plate of the capacitor is coupled to the second node through the fourth diode circuit when the power signal has a second polarity, and the bottom plate of the capacitor is coupled to the first node through the second diode and resonant circuit when the power signal has the second polarity, whereby a local power supply is generated by the capacitor circuit across the first power supply node and the second power supply node.

13. The apparatus of claim 9, further comprising:
a half-bridge drive circuit that is configured to selectively assert a first drive signal and second drive signal in response to a control signal;
a first driver that is coupled between the first power-supply node and the common node, wherein the first driver is arranged to couple the first power-supply node to the common node when the first drive signal is asserted;
a second driver that is coupled between the common node and the second power-supply node, wherein the second driver is arranged to couple the common node to the second power-supply node when the second drive signal is asserted; and
a resonant circuit, wherein the secondary winding of the transformer is coupled to the common node through the resonant circuit, wherein the resonant circuit has a natural resonant frequency in an audio frequency range, and wherein the half-bridge driver is arranged to selectively activate the first and second drivers such that the power-line is modulated with a square-wave signal at a frequency that is associated with an encoded data signal.

14. An apparatus for generating a transmitter clock frequency from a power signal, comprising:
a phase accumulator block that is arranged to increase a phase signal in response to an interrupt;
a phase latch block that is arranged to capture a temporary phase error signal from the phase signal when a zero-crossing is detected in the power signal;
a comparator block that is arranged to compare the last error signal to the temporary phase error signal;
a first summer block that is arranged to increase an error signal when the last error signal is greater than the temporary phase error signal, and further arranged to decrease the error signal when the last error signal is less than the temporary phase error signal;
a first delay block that is arranged to provide the last error signal in response to the error signal;
a filter block that is arranged to provide a filtered signal in response to the phase error signal;
a second delay block that is arranged to provide a last filtered signal in response to the filtered signal;
a second summer block that is arranged to subtract the last filtered signal from the filtered signal to provide a difference signal;
a first gain block that is arranged to provide a proportional signal in response to the filtered signal, wherein the proportional signal is related to the filtered signal according to a proportional gain factor;
a second gain block that is arranged to provide a differential signal in response to the difference signal, where the differential signal is related to the difference signal according to a differential gain factor;
a third summer block that is arranged to combine the proportional signal and the differential signal to provide a correction signal; and
a third gain block that is arranged to provide a proportional and differential correction signal that is related to the correction signal by a proportional and differential gain factor, and a fourth summer block that is arranged to increase a timer adjustment signal in response to the correction signal such that a time interval associated with the interrupt is adjusted by changing the timer adjustment signal.

15. An endpoint that is arranged to communicate with a distribution substation with a power signal over a distribution line in a power distribution network, the endpoint comprising:
a means for locking that is arranged to lock a transmitter frequency to a multiple of the frequency that is associated with the power-signal;
a means for generating that is arranged to generate a carrier frequency for the transmitter in response to the transmitter frequency and a data signal such that the carrier frequency is changed according to the data signal; and a means for modulating that is arranged to modulate the power-signal according to the carrier frequency.

16. The endpoint of claim 15, further comprising a means for formatting that is arranged to format a packet for transmission according to a packet protocol, wherein the packet protocol includes a asynchronous flag field, a health flag field, a payload field, and an error check and detection field, wherein the payload field is defined by a predetermined sequence when the asynchronous flag field is not set, and wherein the payload field is flexibly defined when the asynchronous flag field is set.

17. The endpoint of claim 15, further comprising: a means for powering that is arranged to generate a local power supply for the endpoint using the power signal.

* * * * *